United States Patent [19]

Koike et al.

[11] Patent Number: 4,598,299

[45] Date of Patent: Jul. 1, 1986

[54] DEFLECTION CONTROL INK JET PRINTING APPARATUS

[75] Inventors: Takahisa Koike; Takao Fukazawa, both of Tokyo; Kazumi Ishima, Kashiwa; Toshiharu Murai; Tadashi Itoh, both of Yokohama; Toshifumi Kato, Tokyo; Koichiro Jinnai, Kawasaki, all of Japan

[73] Assignee: Ricoh Company, Ltd., Tokyo, Japan

[21] Appl. No.: 550,289

[22] Filed: Nov. 9, 1983

[30] Foreign Application Priority Data

| | | | |
|---|---|---|---|
| Nov. 11, 1982 | [JP] | Japan | 57-197941 |
| Nov. 11, 1982 | [JP] | Japan | 57-197942 |
| Nov. 11, 1982 | [JP] | Japan | 57-197943 |

[51] Int. Cl.[4] .......... G01D 15/18

[52] U.S. Cl. .......... 346/75; 346/140 R

[58] Field of Search .......... 346/75, 140 IJ

[56] References Cited

U.S. PATENT DOCUMENTS

| | | | |
|---|---|---|---|
| 3,898,673 | 8/1975 | Haskell | 346/75 X |
| 4,281,332 | 7/1981 | Horike | 346/75 |
| 4,286,273 | 8/1981 | Horike | 346/75 |
| 4,310,846 | 1/1982 | Horike | 346/75 |
| 4,364,061 | 12/1982 | Horike et al. | 346/75 |
| 4,370,664 | 1/1983 | Horike et al. | 346/75 |
| 4,395,717 | 7/1983 | Horike et al. | 346/75 |
| 4,426,652 | 1/1984 | Horike et al. | 346/75 |
| 4,435,720 | 3/1984 | Horike et al. | 346/75 |

*Primary Examiner*—George H. Miller, Jr.

*Attorney, Agent, or Firm*—David G. Alexander

[57] ABSTRACT

A deflection control ink jet recording apparatus is capable of compensating for dislocation of dots at all the deflection steps. A deflection amount is adjusted with respect to two points to determine a correlationship between the amplification gain, charge code and deflection amount, so that an amplification gain and a charge code free from dislocation is set for each deflection step. A charge code compensation value is detected to add it to or subtract it from a predetermined charge code assigned to each deflection step, thereby setting a charge voltage code to be assigned to each deflection step in a printout operation.

11 Claims, 20 Drawing Figures

| |
|---|
| Fig. 16a |
| Fig. 16b |

DEFLECTION CONTROL INK JET PRINTING APPARATUS

BACKGROUND OF THE INVENTION

The present invention relates to an ink jet recording apparatus which ejects ink under vibration from a nozzle, selectively charges ink drops by means of a charging electrode in a position where the ink separates into a drop, and deflects charged ink drops by means of a deflection electrode toward predetermined positions on a sheet of paper.

In an ink jet printing apparatus of the type described, ink continuously ejected from a nozzle separates into a drop of a predetermined diameter during its flight. The separation of ink into a drop is effected by applying high frequency vibration of a constant period to the ink, which is communicated under pressure to an ink ejection head. Typical means for applying the vibration is a flat or annular electrostrictive vibrator. A string of ink drops are selectively charged in accordance with print data. When an ink drop moves through a predetermined deflecting electric field, its flight path is deflected depending upon the presence/absence of a charge thereon or a specific level of a charge if present. As a result, the ink drops individually impinge on predetermined positions on a recording medium or a gutter for collection, thereby printing out dots on the recording medium.

The charging principle in the art of ink jet recording utilizes the fact that when ink breaks into drops at a predetermined interval while being deposited with a charge at its tip due to electrostatic induction by an electric field developed by a charging electrode, the charge remains on the separated drops.

In this type of ink jet recording apparatus, the distance between an ink ejection nozzle and a paper is relatively long so that the ink is pressurized to a substantial level to allow an ink drop to fly as far as the paper along a stable path despite the charging and deflecting electric fields. Meanwhile, in order that ink drops may be formed regularly with a predetermined diameter and accurately follow expected deflection paths, stable and accurate controls have to be performed not only over the ink pressure but over ink viscosity, vibration pressure, charge amount, deflecting electric field, etc. Furthermore, ink drops cannot be charged properly or the deflection stabilized unless the application of a charge voltage (pulse) is accurately timed to the separation of a drop from the ink. To meet these requirements, it has been customary to control the ink pressure and/or ink viscosity to a predetermined stable value before a print charge control, and perform a phase search for predetermining the timing for applying voltage pulses, and a deflection adjustment for causing an ink drop charged at a given step to follow a path allocated thereto.

For the phase search, a contact or noncontact type charge detecting electrode is connected to a charge detector circuit whose major components are an amplifier, an integrator and a comparator. Charge voltage pulses having a narrow width are applied to the charge detecting electrode, while the phase of the charge voltage pulses is sequentially shifted at each preselected interval relative to the separation of ink into drops. When the charge detector circuit generates a signal indicative of "charged", a phase of the charge voltage pulses of that instant is determined as a proper charging phase. (This is followed by adjustment of deflection amount and printout operation.)

For the deflection adjustment, a contact or non-contact type charge detecting electrode is disposed one end of which is aligned with a certain deflection path. The charge voltage gain, ink pressure and/or deflection voltage is adjusted such that ink drops charged at a predetermined step of charge voltage are directed toward the end of the charge detecting electrode or barely miss it. For example, a flat charge detecting electrode may be positioned with its upper edge aligned with the flight path of the maximum deflection charged ink drops, as disclosed in Japanese Patent Application No. 55-48882/1982. In such a construction, the charge voltage amplification gain, ink pressure and/or deflection voltage is adjusted until ink drops charged in response to the maximum charge voltage code come to impinge on the upper end of the detector electrode. With this type of arrangement, if mechanical settings related to the flight of ink drops such as ink ejection direction, ink pressure and ink viscosity are controlled to desired values, the flight of drops can be adjusted essentially for all the deflection steps by aligning the flight of drops to a single deflection position.

However, the ink ejection axis (direction of flight of a straightforward ink drop) may become deviated from a desired value. Then, even if one point (e.g. maximum deflection print position) is adjusted into alignment with desired one, other points, particularly minimum deflection print position and low deflection print positions adjacent thereto, will still remain deviated from desired ones. In the case of a single nozzle type apparatus, although such a deviation causes disturbance to a reproduced image, the disturbance is relatively insignificant. However, such disturbance is noticeable in the case of color recording or divisional recording for superposed or divisional recording which uses jets of ink ejected from a plurality of nozzles, because the deviation in print position differs from one nozzle to another.

SUMMARY OF THE INVENTION

It is an object of the present invention to provide a deflection control ink jet recording apparatus which is capable of eliminating deviation in position during printout of data.

It is another object of the present invention to provide a generally improved deflection control ink jet recording apparatus.

A deflection control ink jet recording apparatus of the present invention comprises an ink ejection head having an ink ejection nozzle and a vibrator for applying pressure vibration of a predetermined period to ink which is communicated to the nozzle, a pump for supplying ink under pressure to the ink ejection head, a charging electrode for applying a charging electric field to ink ejected from the nozzle, a deflection electrode for applying a deflecting electric field to charged ink drops, a gutter for capturing uncharged nonprinting ink drops, charge detecting electrode means for detecting low deflection ink drops which miss an upper edge of the gutter and ink drops higher in deflection than those drops, a charge detector circuit connected to the charge detecting electrode means for generating an output signal which indicates detection/nondetection of charged ink drops, and an electronic control unit for reading the detection/nondetection of charged ink drops indicated by the charge detection electrode means and the charge detector circuit, adjusting a charge voltage amplification gain to detect a charge voltage amplification gain in the event of a change of the detection and the nondetection of ink drops from one to the other, adjusting a charge voltage code to detect a charge voltage code in the event of a change of the detection and the nondetection of drops from one to the other, and predetermining a charge voltage amplification gain and a charge voltage cbde for a printout operation based on the detected gain and the detected charge voltage code.

In accordance with the present invention, a deflection control ink jet recording apparatus is capable of compensating for dislocation of dots at all the deflection steps. A deflection amount is adjusted with respect to two points to determine a correlationship between the amplification gain, charge code and deflection amount, so that an amplification gain and charge code free from dislocation is set for each deflection step. A charge code compensation value is detected to add it to or subtract it from predetermined charge code assigned to each deflection step, thereby setting a charge voltage code to be assigned to each deflection step in a printout operation.

DESCRIPTION OF THE PREFERRED EMBODIMENTS

While the deflection control ink jet recording apparatus of the present invention is susceptible of numerous physical embodiments, depending upon the environmnet and requirements of use, substantial numbers of the herein shown and described embodiments have been made, tested and used, and all have performed in an eminently satisfactory manner.

First, the concept from which the present invention derives will be outlined.

Figure 1:
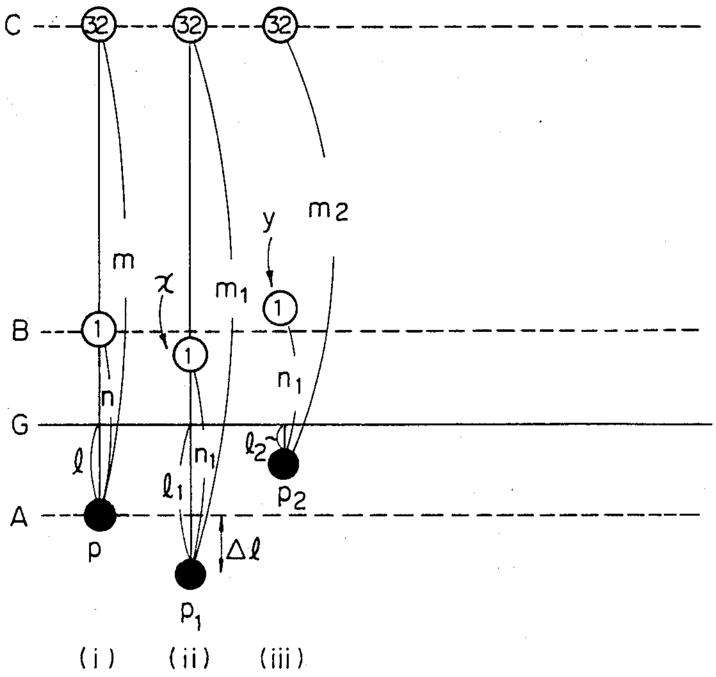
FIG. 1 is a plan view as seen in a direction from an ink ejection nozzle toward a paper sheet.

As shown in FIG. 1 (plan view as seen in the direction from a nozzle toward a paper sheet), assume that A indicates a level of a desired ink ejection axis (flight level of straightforward ink drops), and G the highest level at which a gutter captures nonprinting ink drops. Further, assume that B is the flight level of ink drops deflected by the lowermost one of all the print deflection steps (first step in the case where one line width is covered by thirty-two dots), anc C the flight level of the highest deflection step (32nd step). The following description will focus to the use of thirty-two dots which cover the distance between the levels B and C, as described above.

In FIG. 1, (i) shows a state in which the ejection direction is regular (desired one), (ii) a state in which the ejection direction is deviated downwardly, and (iii) a state in which the ejection direction is deviated upwardly. In the state (i), the previously mentioned prior art deflection adjustment is applicable so that the flight direction at the highest deflection step (32) may be controlled to a desired value to adjust the deflection steps from the first step to the 31st step substantially with no deviation. In the state (ii), however, even if the flight direction at the highest deflection step (32) is adjusted to the desired value by the prior art deflection adjustment, those at the lowest step (1) and other steps adjacent thereto become shifted downwardly from desired positions as indicated by an arrow x in FIG. 1. Likewise, in the state (iii), although the flight direction at the highest step (32) may be adjusted to a desired value by the aforementioned prior art procedure, those at the lowest step (1) and others adjacent thereto become dislocated above the desired positions, as indicated by an arrow y in FIG. 1.

In light of this, a preferred embodiment of the present invention employs the following procedure:

(1) While maintaining a charge code unchanged, the charge gain is adjusted until deflected drops fly just above the upper edge of a gutter, which is adapted to capture nonprinting ink drops, and a gain of that instant is read.

(2) While maintaining the charge gain attained in (1) unchanged, the charge code is sequentially increased from a very small value. The charge code is increased so long as charged drops impinge on an independent charge detecting electrode. As soon as they fail to impinge on the electrode, the instantaneous charge code is read.

(3) Assuming that the preset code in (1) is $C_1$ and the obtained gain is g, and that a value corresponding to $C_1$ in the regular ejection condition (i) of FIG. 1 is $C_{10}$ and a value corresponding to $C_2$, $C_{20}$, it will be seen from FIG. 1 that a relation $k > k_0$ holds if the ejection direction is deviated upwardly as in (iii) and a relation $k < k_0$ if it is deviated downardly as in (ii). $k_0 = m/1$ and $k = C_2/C_1$. In other words, $C_1$ is the initial charge code value corresponding to the position A in FIG. 1 and is preset to the fixed value $C_{10}$. $C_2$ is the detected charge code at which the ink jet is sensed at the position C and has a value $C_{20}$ where there is no deviation of the ink jet from the normal values illustrated in FIG. 1 (i). Thus, a deviation in ejection direction is obtainable by determining k.

Let it be assumed for simplicity that the charge code and the deflection amount are proportional to each other when the charge gain remains constant. Assuming that a deflection amount from the ejection axis Xd is expressed as $Xd = a \cdot g \cdot C$ (where a is a coefficient, g a charge gain, and C a charge code), a downward shift of the ejection direction by an amount $\Delta l$ results in the following equations:

$$l + \Delta l = a \cdot g \cdot C_2 \quad \text{Eq. (1)}$$

$$m + \Delta l = a \cdot g \cdot C_1 \quad \text{Eq. (2)}$$

$$l = a \cdot g \cdot C_{20} \quad \text{Eq. (3)}$$

$$m = a \cdot g \cdot C_{10} \quad \text{Eq. (4)}$$

where l and m are the values shown in FIG. 1.

From Eqs. (1)-(4), the following equation is derived:

$$\begin{aligned} \Delta l &= (C_2 m - C_1 l)/(C_1 - C_2) \\ &= m(C_2 - C_1/K)/(C_1 - C_2) \end{aligned} \quad \text{Eq. (5)}$$

Then, $g_1 = m \cdot g/(m + \Delta l)$ and the gain are set again. Such a procedure allows the distance between dots or interdot distance from the first step to the 32nd step (character height) to remain constant.

(4) The relative distance between dots has been made constant in (3). Next, the absolute positions thereof will be determined. Assuming that the charge code from the first to the 32nd steps are Cpi (i=1 to 32), the charge codes Cpi for the respective charge steps are compensated to be $Cpi_1$ such that the following relations hold:

$$Cpi_1 = Cpi + \Delta C$$

and $$C = \Delta l / ag_1$$

The above procedure is effective to compensate for any positional deviation of the dot matrix in the up-down direction while maintaining it in a proper relative position.

Hereinafter will be described details of a preferred embodiment of the present invention.

Figure 2:
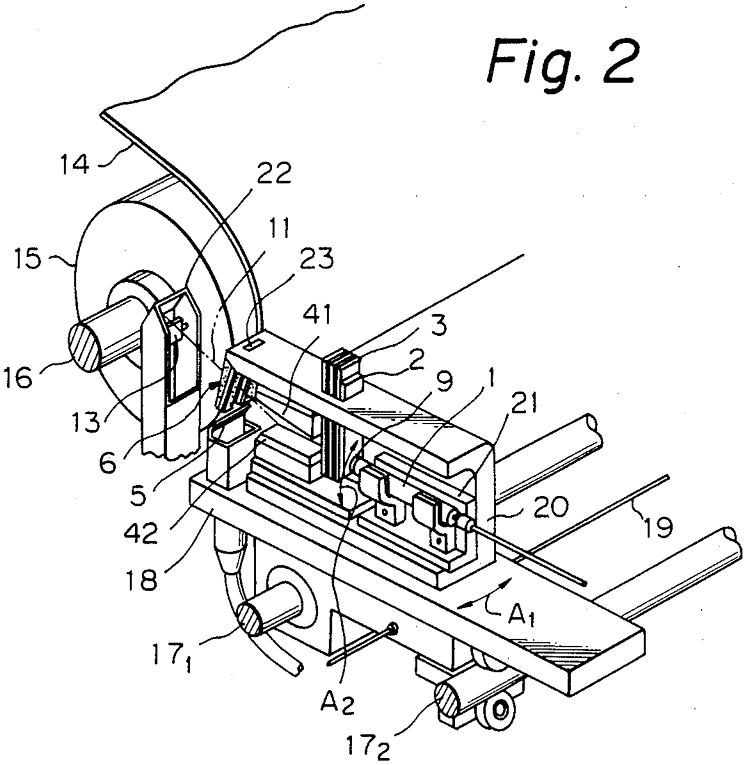
FIG. 2 is a perspective view of essential mechanical part of an ink jet printer to which the present invention is applicable.
Figure 3:
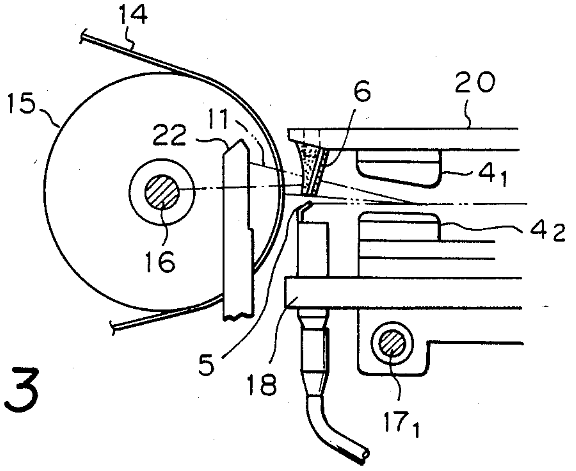
FIG. 3 is a side elevation of the construction shown in FIG. 2.

An essential mechanical arrangement of an ink jet printer to which the present invention is applicable is shown in FIGS. 2 and 3. As shown, a paper 14 is passed over a platen 15 which is mounted on a shaft 16. A pair of guide bars $17_1$ and $17_2$ extend parallel to the platen shaft 16, while a carriage 18 is mounted on the guide bars $17_1$ and $17_2$ for reciprocation therealong. A horizontal scan drive mechanism (not shown) drives the carriage 18 through a wire 19 such that the carriage 18 strokes rightwardly from the illustrated home position as far as a preselected position outside the paper width and, then, leftwardly back to the home position.

A head assembly support base 20 is pivotally mounted on the carriage 18. The angular position of the support base 20 is adjustable along the top of the carriage 18 as indicated by an arrow $A_1$ in FIG. 2 by means of a mechanism not shown. The support base 20 carries therewith a head base 21 which is pivotable along the vertical surface of the support base 20 as indicated by an arrow $A_2$, also operated by a mechanism not shown. Rigidly mounted on the head base 21 is an ink ejection head 1 which comprises a metal tube secured to a cylindrical electrostrictive vibrator. A nozzle plate formed with an ejection port is fit on the foremost end of the metal tube.

The support base 20 also carries therewith a charging electrode plate 2, a shield electrode plate 3, deflection electrodes $4_1$ and $4_2$, and a shield electrode plate 6. A gutter 5 for capturing nonprinting ink drops is securely mounted on the carriage 18. As shown in FIG. 3, the end of the shield electrode plate 6 which faces the paper 4 is provided with a curvature the center of which coincides with the axis of the platen shaft 16, so that it is spaced a same distance from the paper over the entire area.

Figure 4:
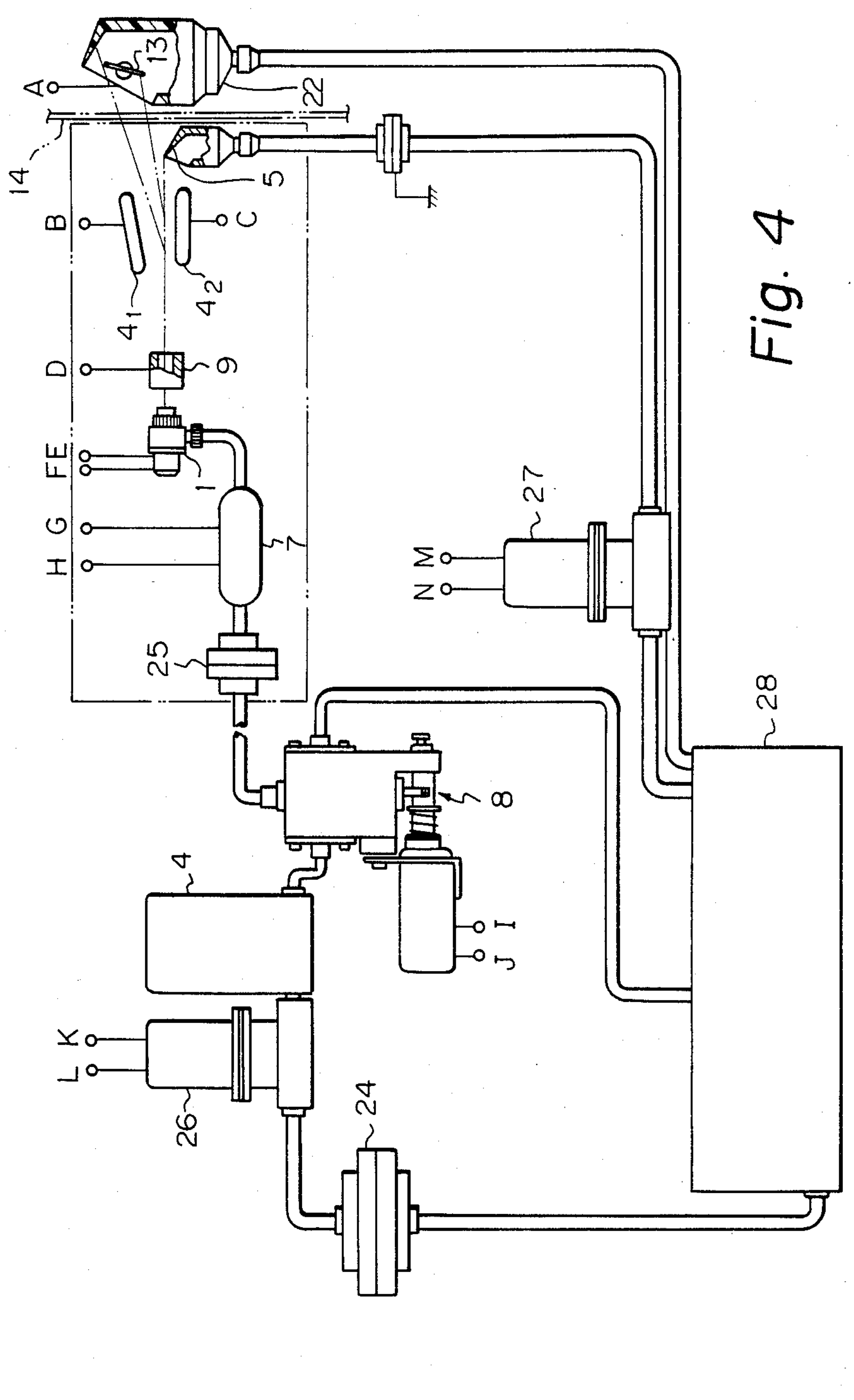
FIG. 4 is a view of an ink supply line and an ink circulation line associated therewith.
Figure 5:
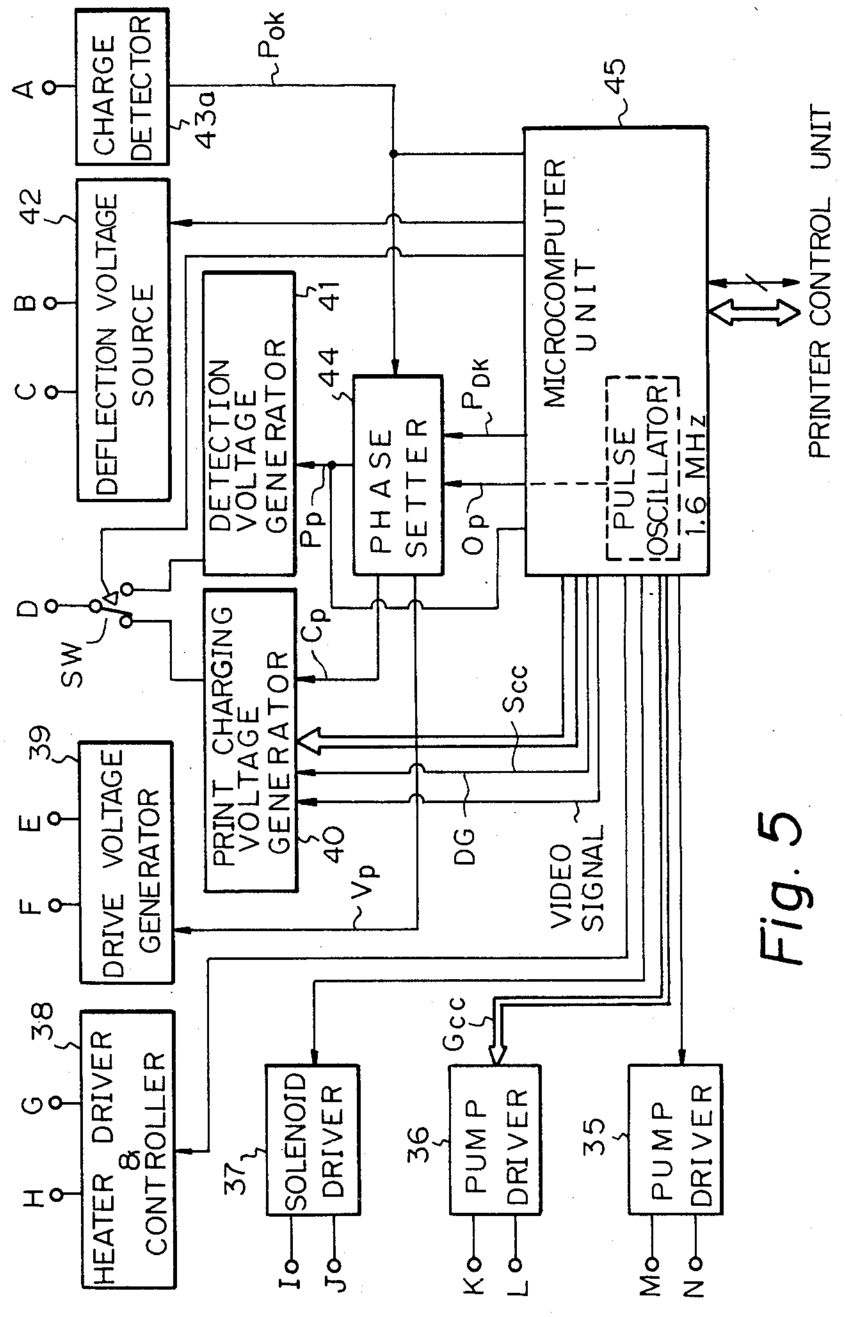
FIGS. 5 and 6 are block diagrams of different examples of a control circuit.

Referring to FIG. 4, an ink supply line installed in the ink jet printer of FIG. 2 is shown. An electric control circuit associated with the ink supply line is shown in FIG. 5.

In FIG. 4, ink in a reservoir 28 is sucked and compressed by a pump 26 via a filter 24 and fed therefrom to an accumulator 4, which serves to absorb any pressure fluctuation due to the operation of the pump 26. The ink regulated to a constant pressure is supplied to the ejection head 1 by way of an electromagnetic valve 8, a filter 25 and a heater 7. The head 1 applies to the ink a pressure variation of a predetermined frequency by causing the electrostrictive element to oscillate at a predetermined frequency. The ink ejected from the nozzle of the head 1 separates into a drop at a position spaced a given distance ahead the nozzle.

At the position where the separation of ink occurs, there is located a charging electrode 9 (rigid on the charging electrode plate 2). When a charge voltage is applied across the electrode 9 while the ink is separating into a drop, the ink drop is charged to a polarity opposite to that of the charge voltage polarity. The charged ink drop is effected by a deflecting electric field developed across the deflection electrodes $4_1$ and $4_2$ so that, while the head 1 is in a print position, it will impinge on the paper 14 and, while the head 1 is in the home position, it will fly toward a gutter 22. Meanwhile, a noncharged ink drop is directed toward a gutter 5 regardless of the position of the head. That is, the section of FIG. 4 enclosed by a dots-and-dash line is mounted on the carriage 18, and the gutter 22 is so positioned as to capture charged ink drops when the carriage 18 is in the home position. In the home position of the carriage 18, the path of flight of ejected ink drops misses the marginal edge of the paper 14 thereby allowing the gutter 22 to catch charged ink drops. The ink in the gutter 5 is returned to the reservoir 28 by a pump 27, while the ink in the gutter 22 returns to the reservoir 28 by gravity. To stop ink ejection, the pump 26 and heater 7 are deenergized and, then, a solenoid associated with the valve 8 and, then, the pump 27. On the deenergization of the solenoid, the valve 8 interrupts communication between the accumulator 4 and the filter 25 and, instead, provides communication between the reservoir 28 and the filter 25. Disposed in the gutter 22 is a flat charge detection electrode 13 which is electrically insulated from the gutter 22.

The control circuit for performing a printout control will be described.

Figure 6:
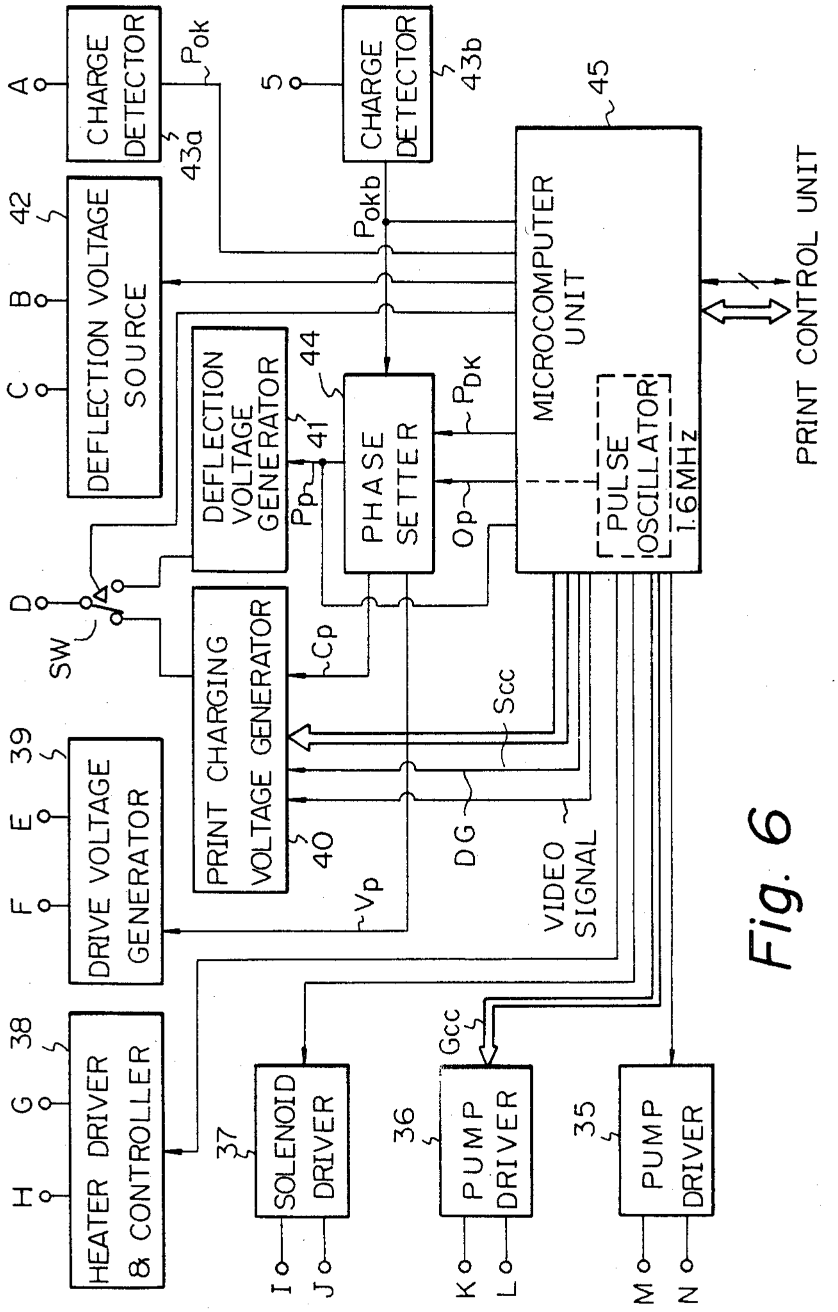

FIG. 5 shows a first example of the control circuit which includes a charge detector circuit 43*a* connected to the charge detecting electrode 13 at the home position. FIG. 6 shows a second example which includes a charge detector circuit 43*b* connected to the conductive gutter 5, in addition to the charge detector 43*a*. Concerning the circuit construction, the charge detectors 43*a* and 43*b* are essentially identical with each other.

Figure 7:
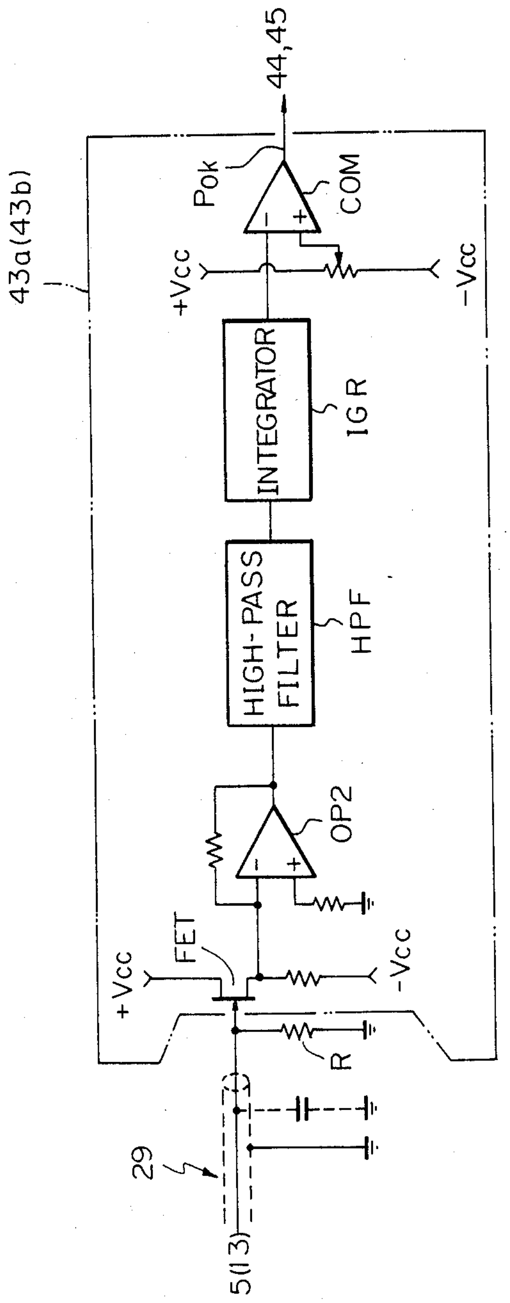
FIG. 7 is a block diagram of a charge detector circuit included in the control circuit shown in FIG. 5 or 6.

Referring to FIG. 7, the construction of the charge detector circuit 43 (5) of FIGS. 5 and 6 is illustrated. In FIG. 7, the electrode 13 (gutter 5) and charge detector 43*a* (43*b*) are interconnected by a shield wire 29. Connected between the core of the shield wire 29 and ground is a resistor R for voltage conversion. The resistor R has a resistance Rc of 100 kΩ which is smaller than an insulation resistance Rg between the electrode 13 (gutter 5) and ground, in order that the resistance Rg may be freed from fluctuation due to smearing of the electrode 13 (gutter 5), which would otherwise render the charge detection unstable. The charge detector 43*a* (43*b*) is connected to the core of the shield wire 29. The charge detector 43*a* (43*b*) is made up of a field effect transistor FET having a high input impedance, an operational amplifier (op amp) $OP_1$, a high pass filter HPF, an integrator IGR for smoothing a d.c. component, and a comparator COM. The charge detector 43*a* (43*b*) will develop a logical "0" output while charged ink drops are impinging on the gutter 5.

Figure 8:
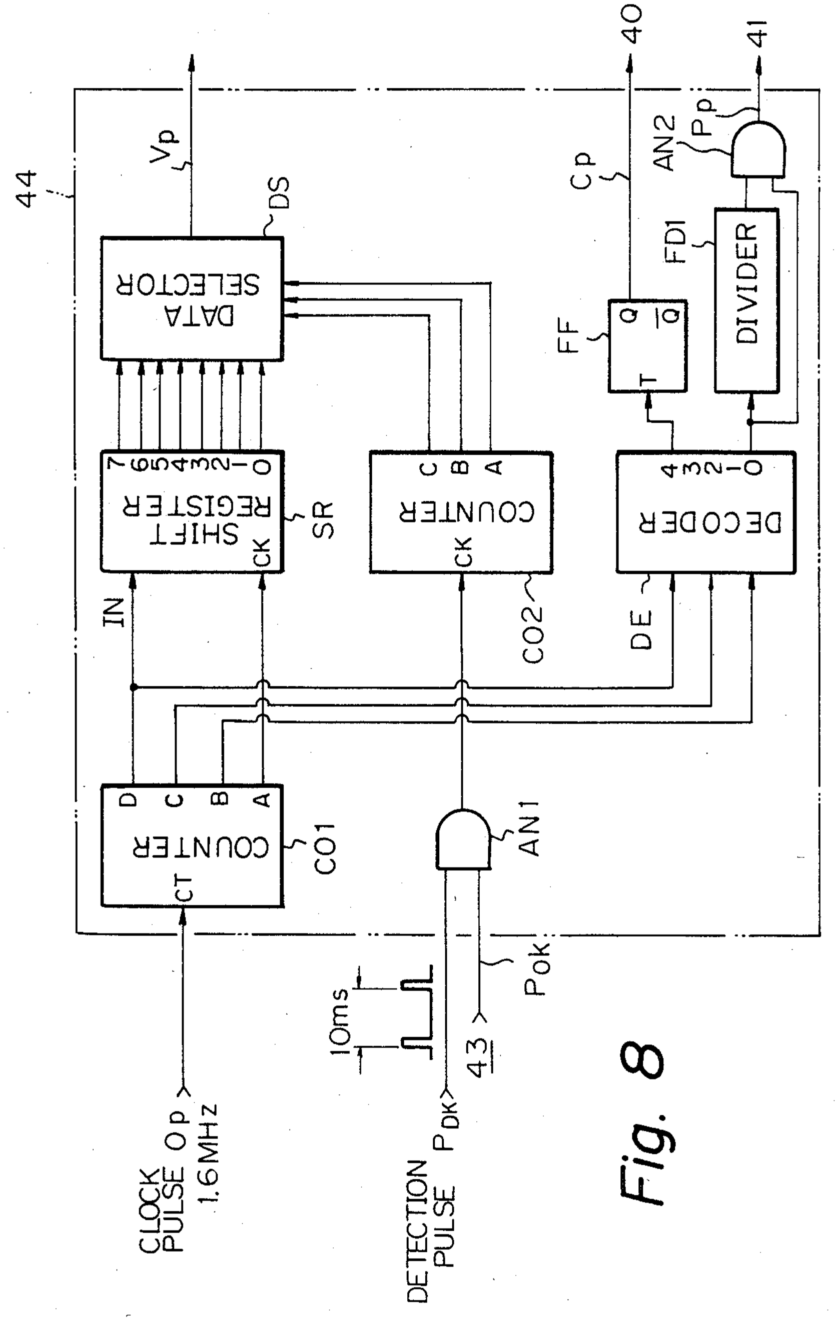
FIG. 8 is a block diagram of a phase setting circuit also shown in FIG. 5 or 6.
Figure 9:
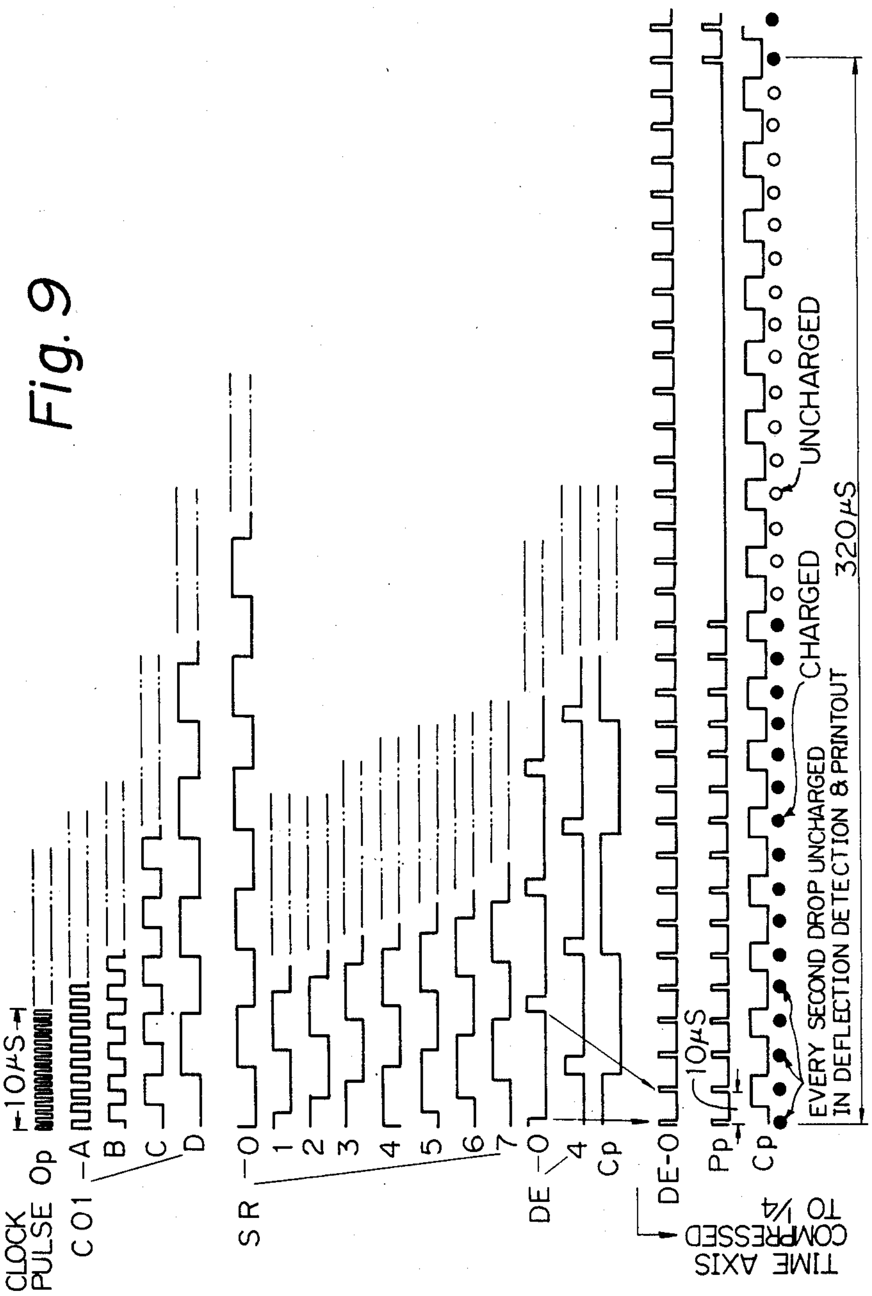
FIG. 9 is a timing chart showing input and output signals of the phase setting circuit.

Referring to FIG. 8, a phase setting circuit 44 shown in FIGS. 5 and 6 is illustrated in detail. Waveforms which will appear in various portions of the circuit 44 are shown in FIG. 9. Clock pulses Op having a frequency of 1.6 MHz are applied to the phase setter 44 and counted by a counter CO1 built thereinside. The counter CO1 produces a count code having bits A-D (A=first digit to D=fourth digit). The bit A is applied as a shift pulse to a serial-in parallel-out shift register SR, while the bit D is applied also to the shift register SR as an input signal. As a result, the shift register SR produces at its output terminals 0–7 pulses sequentially deviated in phase by a period of A and each having a width of D. A data selector DS selects one of the pulses output from the shift register SR and supplies it to a drive voltage generator 39 as a vibrator drive pulse Vp.

The output bits B-D of the counter CO1 are coupled to a decoder DE which then develops output pulses at a first output terminal 0 and a fifth output terminal 4. These decoder output pulses are respectively delivered to a frequency divider FD and a T flip-flop FF. The Q output of the flip-flop FF is applied to a print charge voltage generator 40 as a charge timing signal Cp. The pulse divided to 1/16 by the divider FD1 and then shaped by an AND gate AN2 to the width of the pulse appearing at the decoder output terminal 0 is delivered to a search charge voltage generator 41 as a phase search charge pulse Pp. As shown in FIG. 9, the charge signal Pp consists of a train of sixteen pulses and an interval corresponding to sixteen successive pulses, the pulse train and interval being followed by another pulse train and intervaal at a period of 320 microseconds. In contrast, the print charge timing signal Cp is a continuous train of pulses each having a width (logical "1" level) eight times that of the pulse Pp.

Figure 10:
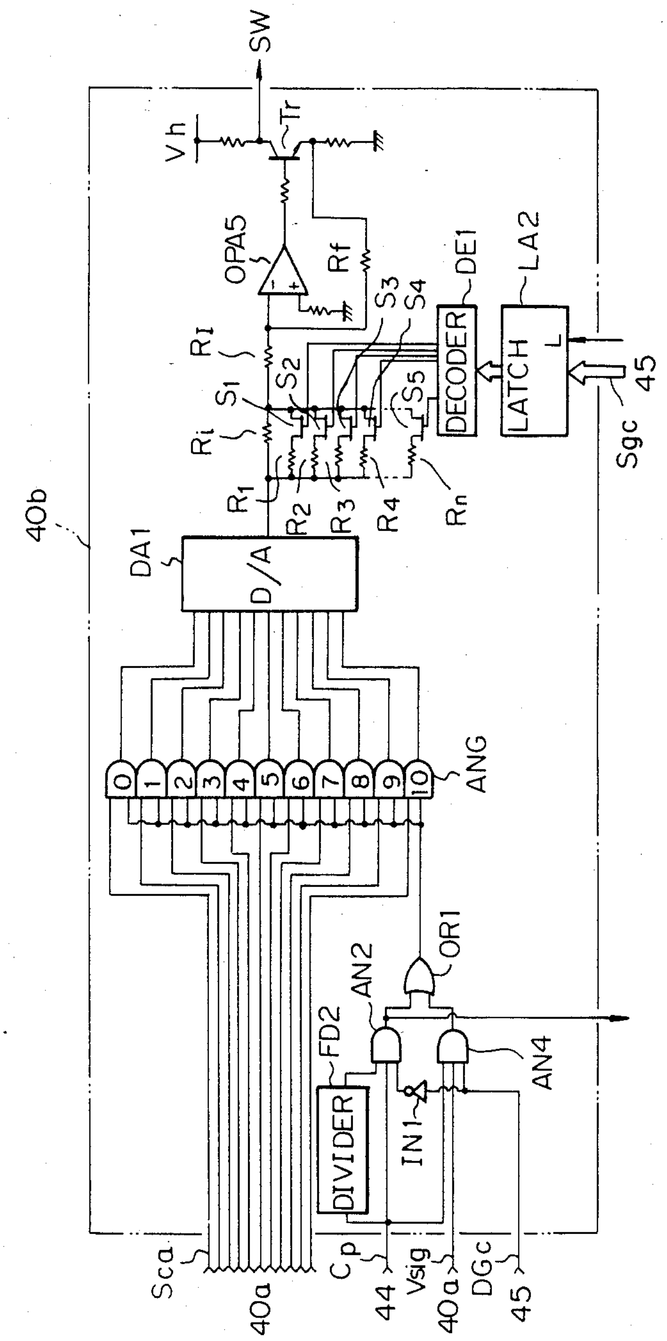
FIG. 10 is a block diagram of a gain adjusting section which forms part of a print charge voltage generator shown in FIG. 5 or 6.
Figure 11:
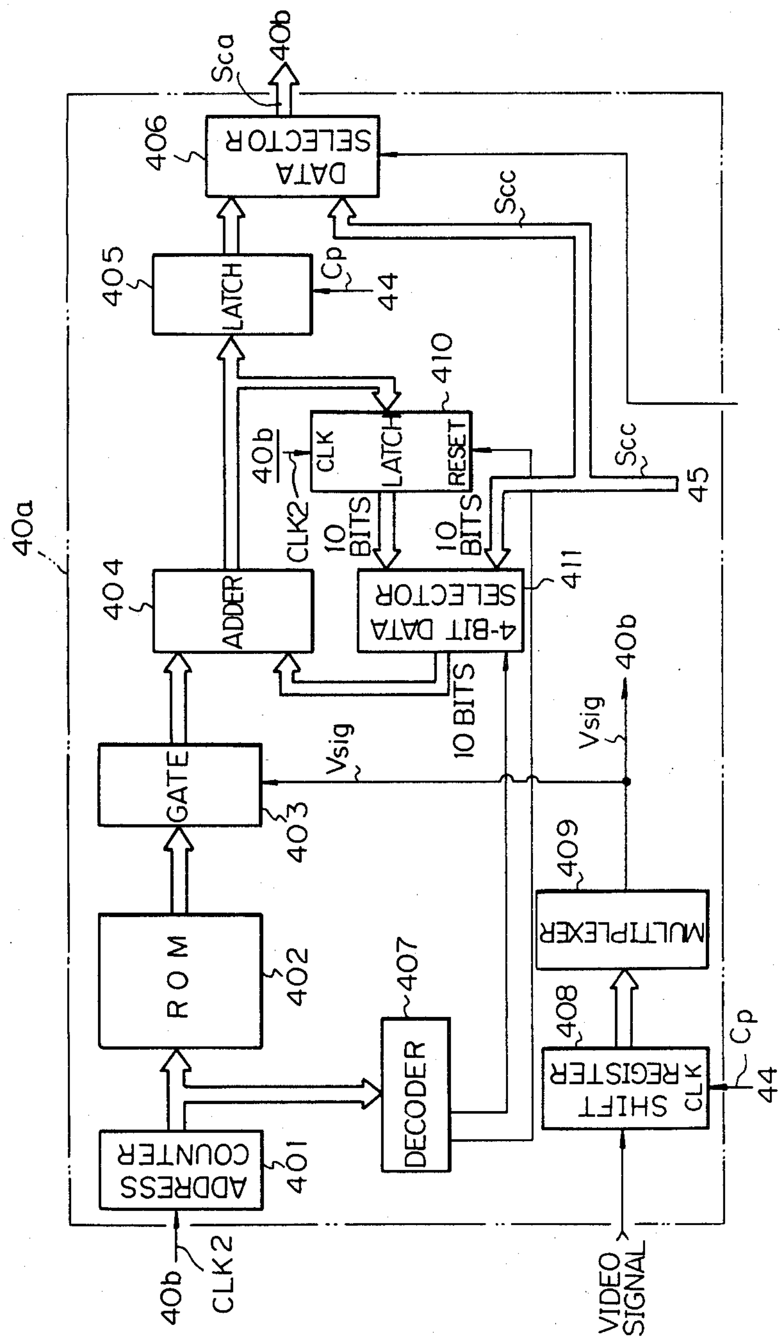
FIG. 11 is a block diagram of a charge code generating section which forms the other part of the print charge voltage generator.

While both the phase search charge pulses Pp and the print charge timing pulses Cp are fixed in phase, the phase of the drive pulses Vp are shifted or changed by the data selector DS depending upon which one of the shift register outputs 0–7 is to be delivered, as is determined by the count codes A-C of a counter CO2. That is, the phase of charge voltage pulses is fixed and the separation phase of ink is shifted Referring to FIG. 10, an amplification gain adjusting section 40*b*, which forms one half of the print charge voltage generator 40, is shown. Counterpart of the section 40*b* is a charge voltage code generating section 40*a* which is shown in FIG. 11. During a printout operation, the charge voltage code generator 40*a* supplies the gain adjuster 40*b* with a charge voltage code Sca (a plurality of values corresponding to deflection steps) in synchronism with pulses Pp. The charge voltage code Sca is selectively set in an input AND gate group ANG of a digital-to-analog (D/A )converter DA1. During a deflection adjustment, a charge pattern is formed as in a phase search. For these operations, the gain adjuster 40*b* comprises a frequency divider FD2, AND gates AN3 and AN4, an OR gate OR1 and an inverter IN1. In order that the deflection may be adjusted by the adjustment of the charge voltage amplification gain as well, the gain adjuster 40*b* additionally comprises resistors R1–Rn and transistors S1–Sn for setting a specific gain, a latch LA2 for holding a gain indication code, a decoder DE1 for converting a gain indication code into a signal for designating a transistor to be turned on, an operational amplifier (op amp) OPA5, and an output transistor TR.

As shown in FIG. 11, the charge code generator 40*a* comprises an address counter 401 for addressing a read only memory (ROM) 402 which stores therein standard charge voltage codes Vcs (Cpi, i=1 to 32) relating to the first to 32nd deflection steps, as well as codes for compensating for distortions in deflection and charge due to charge patterns. The charge code generator 40*a* also comprises a gate circuit 403 for determining a timing for delivering data read out of the ROM 402, an adder circuit 404 for adding to a standard charge voltage code Vcs codes necessary for deflection adjustment, i.e. compensation value code and distortion compensation code. Further included in the charge code generator 40*a* are a latch 405 for latching a charge voltage code $Cpi_1$ while one dot is charged, a data selector 406 for supplying the gain adjuster 40*b* with an output code $Cpi_1$ of the latch 405 during a print charging and with a charge code Scc output from a microcomputer 45 during a deflection adjustment, a decoder 407, a serial-in parallel-out shift register 408 for storing an 8-bit video signal, a multiplexer 409 for delivering the 8-bit output of the shift register 408 one bit at a time, a latch 411 for latching a deflection compensation code, and a latch 410 for latching an output of the adder 404.

Figure 12:
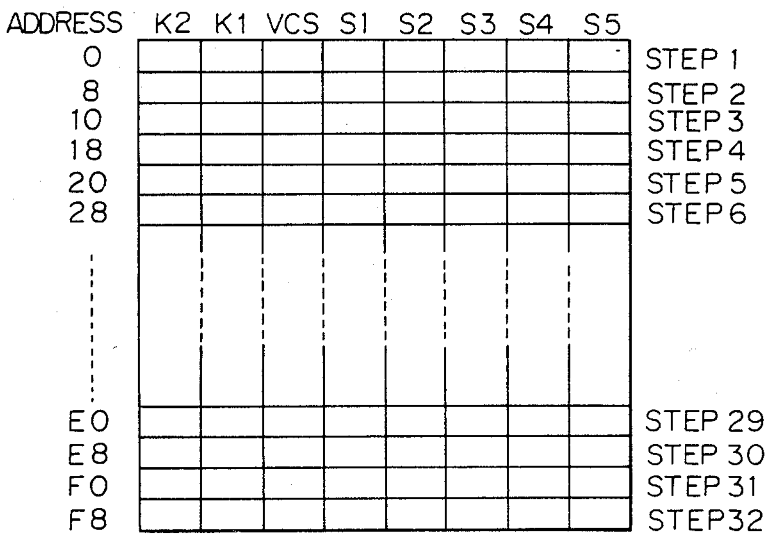
FIG. 12 is a plan view of addresses showing data written in a read only memory of FIG. 11.

Referring to FIG. 12, addresses of the ROM 402 are shown. The address counter 401 sequentially reads charge deflection compensation values and standard charge codes Vcs from K2 to S5 of the first step out of the ROM 402. The gate 403 determines whether or not to add a compensation value to a standard charge code Vcs while matching it with a video signal (pring data). The video signal is sequentially shifted into the shift register 408 in response to the signal Cp which is synchronous with the printout period and, in that while, the values in the shift register are sequentially read thereoutof by the multiplexer 409 eight consecutive times by means of clock pulses CLK2, the frequency of which is eight times the frequency of the signal Cp. Only necessary compensation codes are added to the outputs of the shift register by the gate 403, adder 404 and latch 410. After eight times of addition, the compensated charge code is latched by the latch 405. At the same time, the latch 410 is reset to prepare for the next addition. The resetting signal is prepared by decoding an address code by the decoder 407. Timed to the next addition after resetting of the latch 410, the data selector 411 supplies the adder 404 not the output of the latch 410 but the compensation code output from the microcomputer 45. In this manner, charge codes associated with the first and 32nd steps and undergone distortion and deflection compensation are applied to the gain adjuster 40*b* via the latch 405 and data selector 406.

Figure 13:
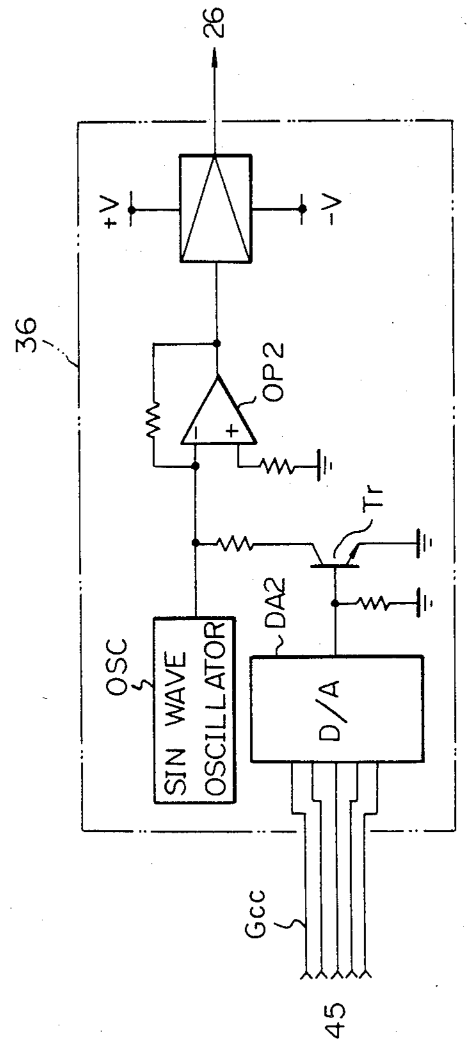
FIG. 13 is a block diagram of a pump driver shown in FIG. 5 or 6.

Referring to FIG. 13, a pump drive circuit 36 is constructed to serve as means for setting an ink pressure. That is, the pump driver 36 varies an ink pressure to control the ink flying velocity to a predetermined value. The pump 26 is of the reciprocation type in which a plunger is driven in a reciprocal movement by a.c. energization of a solenoid associated therewith and, therefore, the delivery pressure of the pump 26 is variable by varying the solenoid energizing voltage level by means of the pump driver 36. In the pump driver 36, the output voltage level of a sinusoidal wave oscillator OSC is adjusted by an operational amplifier (op amp) OP2 the output of which is applied to an output amplifier to thereby develop a voltage for energizing the pump solenoid. The gain of the op amp OP2 is dependent upon the conductivity of a transistor Tr. If the gain code Gcc applied to a digital-to-analog (D/A) converter DA2 has a large value, the conductivity of the transistor Tr will be high, the gain of the op amp OP2 will be small and, therefore, the delivery pressure (ink pressure) of the pump 26 will be low; if the gain code Gcc is of a small value, the gain of the op amp OP2 will be large and, therefore, the delivery pressure of the pump 26 will be high.

Figure 14:
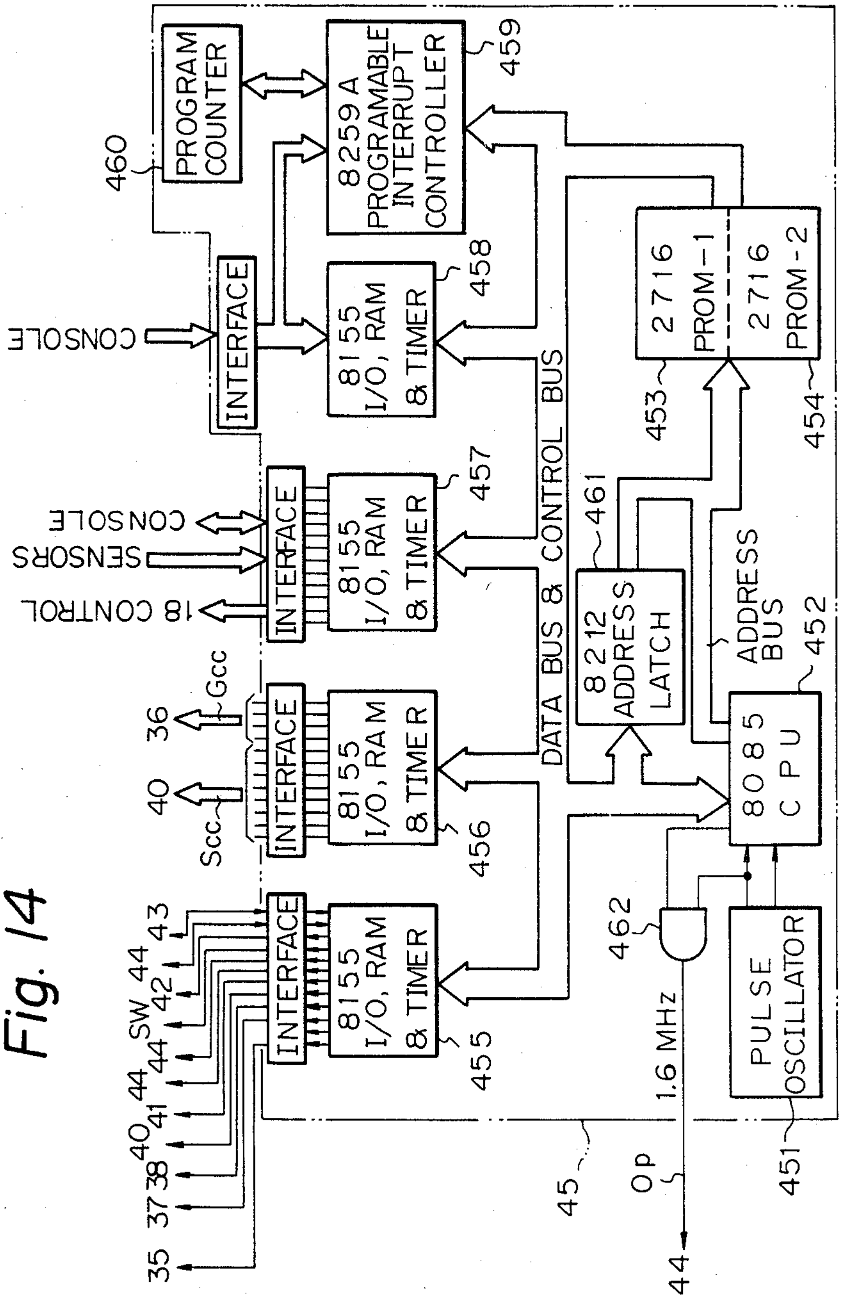
FIG. 14 is a block diagram of a microcomputer unit printer control operation performed by the microcomputer shown in FIG. 5 or 6.

Details of the microcomputer unit 45 employed as an electronic control device are shown in FIG. 14. The microcomputer unit 45 comprises a pulse generator 451, a microprocessor (microcomputer) 452, a programmable ROMs (PROs) 453 and 345 which allow data to be written thereinto or read thereoutof by means of ultraviolet rays, random access memories (RAMs) 455–458 each having an I/O port and a timer, a programmable interrupt controller 459, a program counter 460 and an address latch 461. The RAMs 455–458 are individually connected via amplifiers, inverters and other interfaces to sensor signal lines, control signal lines and data lines which are necessary for all the ink jet printer control such as ink ejection control, phase search control, deflection adjustment control, print charge control, carriage drive control and sheet feed control. The PROMs 453 and 454 store therein program data for executing the ink jet printer controls.

Figure 15A:
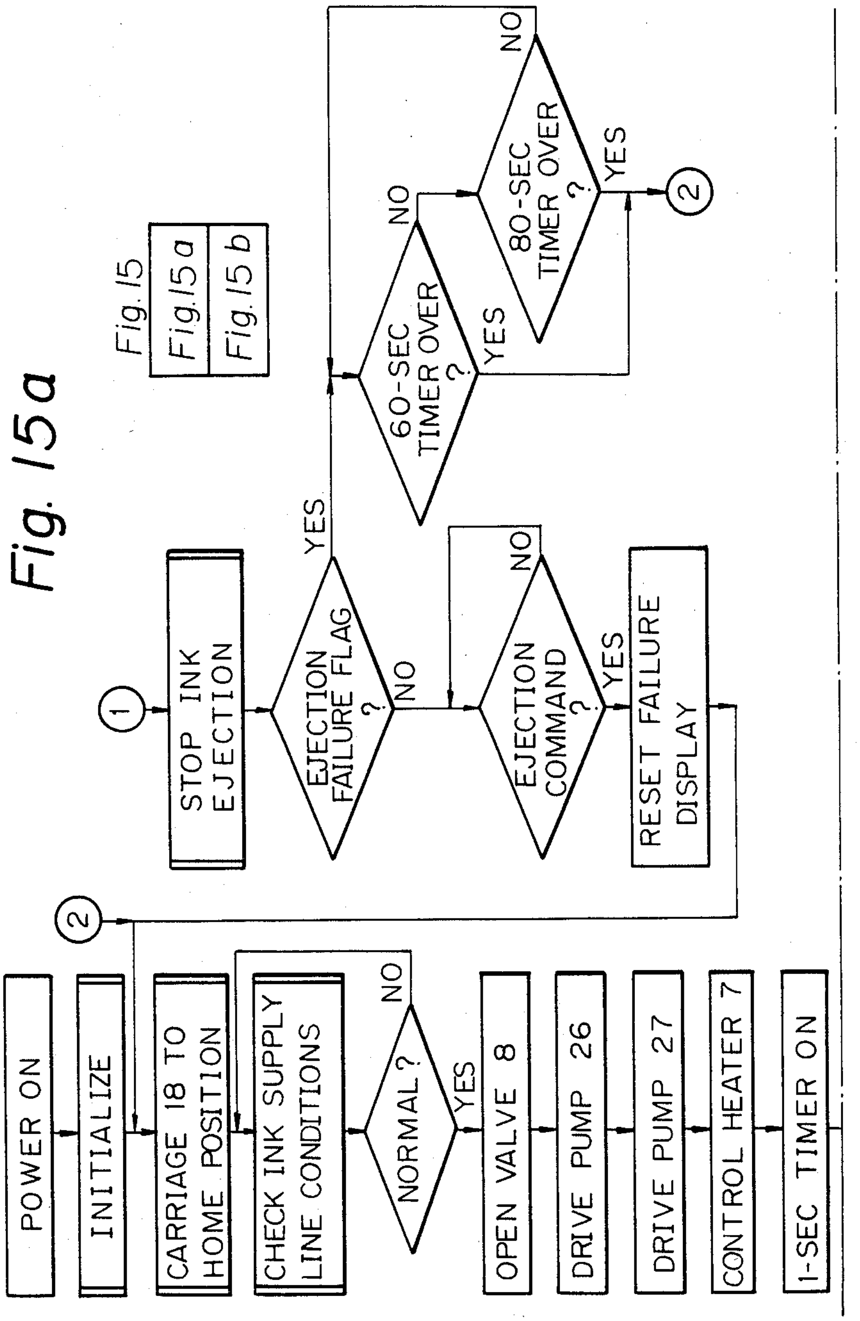
FIG. 15 is a flowchart demonstrating an ink jet printer control operation also performed by the microcomputer shown in FIGS. 5 or 6 and 14.
Figure 15B:
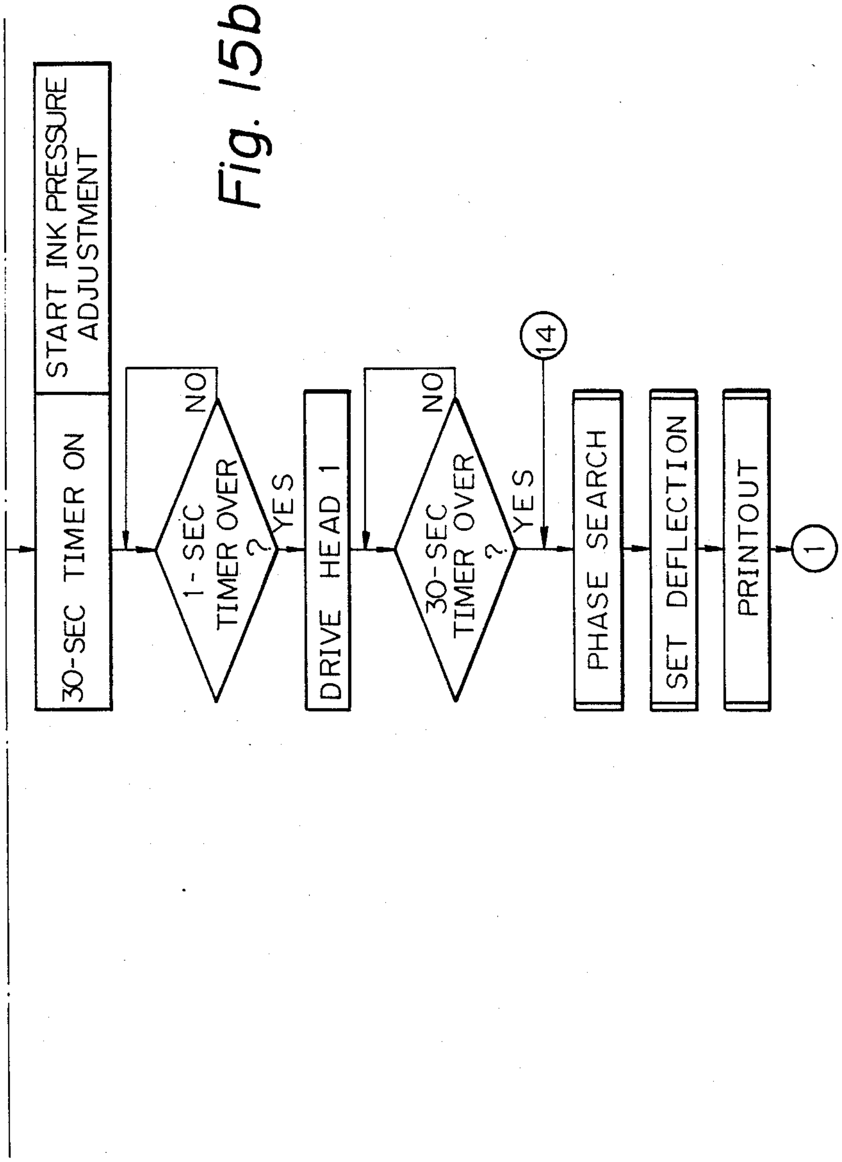

Referring to FIG. 15, the flowchart demonstrates a main flow of the ink jet printer controls which will proceed as instructed by the program data. When, powered, the microcomputer 45 reads the header of a control program to initialize the input/output ports and sets up a printer stop and standby condition (ink ejection stopped and deflection voltage cut off). Then, the microcomputer 45 brings the carriage 18 to the home position (where the head 1 faces the gutter 22). Seeing output signals of various sensors, the microcomputer 45 provides a display indicative of a failure if any, and awaits the removal of the failure. If all the sensor outputs are normal or have been made normal, the microcomputer 45 energizes the valve 8 to establish communication between the accumulator 4 and the filter 25, supplies the D/A converter DA2 of the pump driver 36 with a standard gain code Gcc to drive the pump 27, causes the pump driver 35 to drive the pump 27, and causes the heater driver 38 to perform a temperature control over the ink. After triggering a 1-sec timer and, then, a 30-sec timer, the microcomputer 45 starts on adjustment of the ink pressure.

As soon as one second is over, the microcomputer 45 enables an AND gate 462 (FIG. 14) to deliver the 1.6 MHz clock pulses Op to the phase setter 44. This supplies the drive voltage generator 39 with the drive clock pulses Vp so that the electrostrictive vibrator of the head 1 is caused to oscillate to apply pressure vibration to the ink inside the head 1. Ink ejected from the head 1 separates into a drop in the manner previously discussed, the drop impinging on the gutter 5. On the lapse of thirty seconds as counted by the 30-sec timer, the ink pressure has been stablizied at a predetermined level which allows ink drops to fly at a predetermined velocity. Therefore, the microcomputer 45 advances to a phase search and, then, to a deflection setting and, then, to a print control. After a printout operation, the microcomputer 45 stops ejection of the ink and awaits an ink ejection instruction. When entered into the print control, the microcomputer 45 triggers an 80-sec timer. On the lapse of eighty seconds, the microcomputer 45 advances to a phase search when the printout procedure reaches a given point and, further, to a deflection setting. After these operations, the microcomputer 45 triggers the 80-sec timer again, returns to the print control, and executes another phase search and deflection setting on the lapse of eighty seconds.

Figures 16, 16A:
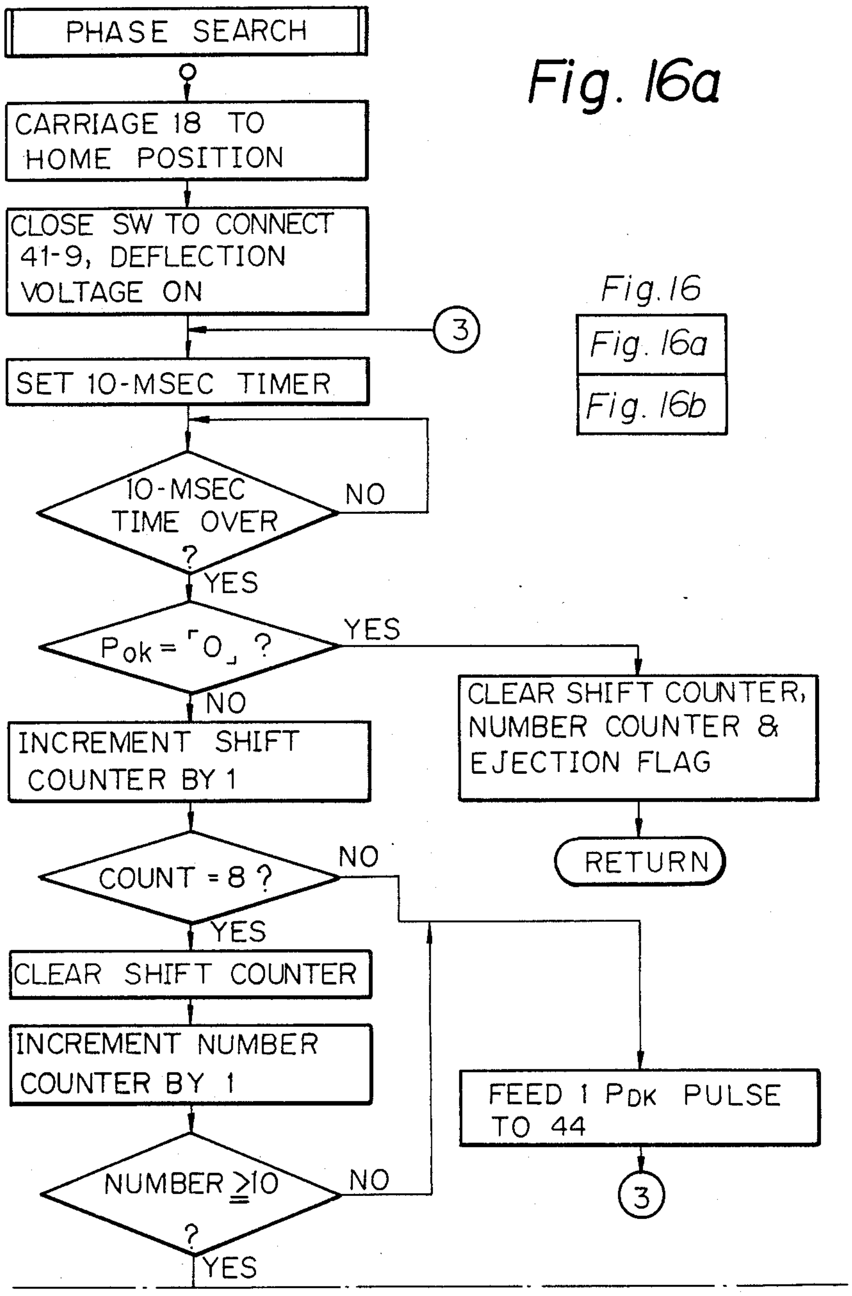
FIGS. 16 and 17 are flowcharts demonstrating a phase search control operation also performed by the microcomputer.
Figure 16B:
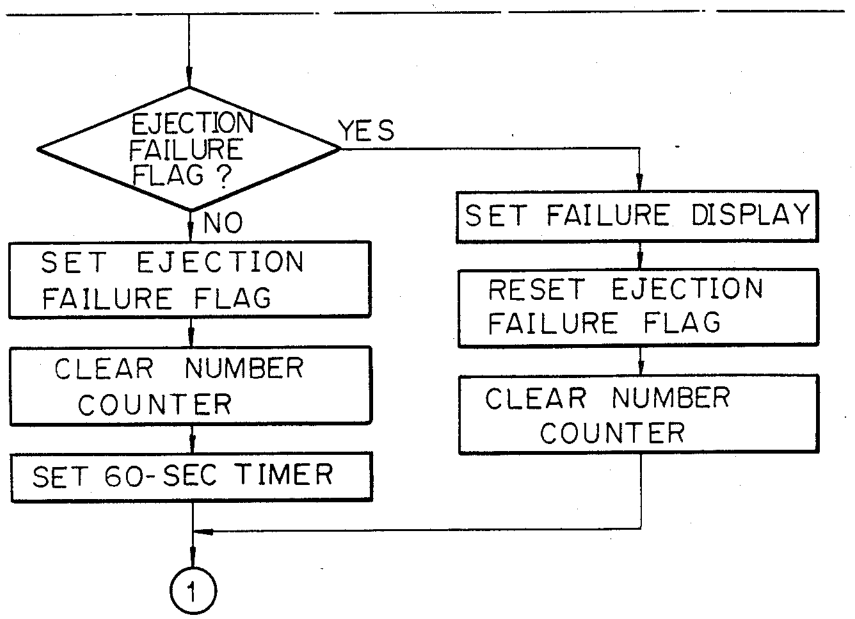

Reference will be made to FIG. 16 for describing the phase search control perfomed by the circuitry of FIG. 5.

In the phase search, the microcomputer 45 moves the carriage 18 to the home position, and closes the switch SW to connect the charge electrode to a search charge voltage generator 41. Then, the microcomputer 45 makes a deflection voltage source circuit 42 apply a deflection voltage. In this condition, the microcomputer 45 awaits the lapse of 10 milliseconds. The connection of the switch SW to the search charge voltage generator 41 causes search charge pulses given by amplifying the search charge pulses Pp (see FIG. 9) to be fed to the electrode 9. That is, phase search charge pulses having a period of 10 microseconds and intermittently appearing at the period of 320 microseconds are fed from the search charge voltage generator 41 to the charge electrode 9 via the switch SW.

Assuming that the count code output from the counter CO2 is "000", the pulses appearing at the output terminal 0 of the shift register SR are applied to the drive voltage generator 39 as the drive pulses Vp and, therefore, the ink separates into drops in a phase corresponding to the period and phase of the drive pulses Vp (phase corresponding to the pulses Pp). If the separation of ink is timed to the pulse Pp, the resulting drop is negatively charged and, because the deflection voltage has been applied, it becomes deflected to impinge on the charge detecting electrode 13 missing the gutter 5. That is, the ink drops appearing at the period of pulses Pp develop a charge pattern of a frequency of 320 microseconds in which sixteen successive drops are negatively charged and the next sixteen are uncharged, the charged drops impinging on the electrode 13. In this case, therefore, the potential at the electrode 13 varies in the same manner as the charge pattern.

However, due to the stray capacity of the shield wire 29 and the time constant of the resistor R, the base of the FET in the charge detector 43 develops a potential fluctuation in a sinusoidal wave or an envelope whose period is 320 microseconds. Such a sinusoidal voltage is inverted by the FET, amplified by the op amp OP1, and then applied to the high pass filter HPF at a positive level. The high pass filter HPF is adapted to cut off noise less than 320 microseconds in period. The integrator IGR smooths the sinusoidal wave of the 320-microsecond frequency to stabilize it at a d.c. constant level. This d.c. voltage is compared with a reference voltage by the comparator COM. If the d.c. voltage is higher than the reference voltage indicating that ink drops are charged, the output Pok of the comparator COM becomes logical "0". When ink drops are not charged or charged incompletely, the output Pok of the comparator COM is logical "1". The output Pok of the comparator COM is applied to the microcomputer 45 and to the AND gate AN1 of the phase setter 44.

To summarize the above operation, ink drops will be charged if the separation phase of ink is coincident with the pulses Pp and not if not. The output Pok of the charge detector 43 turns to logical "0" level if the drops are charged, while remaining logical "1" level if not. Upon the lapse of 10 milliseconds, the microcomputer sees the detector output Pok and, if it is logical "0", clears counters and flags to advance to a deflection setting step determining that the ink separation phase is properly related to the phase of the search charge voltage pulses. However, if the detector output Pok is logical "1" indicative of a deviation of the ink separation phase from the phase of the search charge voltage pulses, the microcomputer 45 increments a shift counter (program counter) by one to supply the phase setter 44 with a Pdk1 pulse.

In response to the Pdk1 pulse, the phase setter 44 increments the counter CO2 by one so that the phase of the separation drive pulse Vp is delayed by one step. That is, as the counter CO2 is incremented, the output Vp of the data selector DS changes from a pulse appearing at an output terminal i of the shift register SR to a pulse appearing at an output terminal i+1. The counter CO2 is a cyclic counter. If the ink ejection is normal, ink drops will be charged to make the output Pok of the comparator COM logical "0" while pulses appearing at either one of the outputs 0–7 of the shift register SR are applied to the drive voltage generator 39. The microcomputer 45, after the supply of the Pdk1 pulse to the phase setter 44, awaits the lapse of 10 milliseconds. As this period of time expires, the microcomputer 45 sees the detector output Pok and, if it is logical "0", advances to a deflection setting step and, if it logical "1", increments the shift counter to supply a Pdkl pulse to the phase setter 44 and sets the 10-msec timer.

In the manner described, the microcomputer 45 supplies countup pulses Pdk to the phase setter 44 until the output Pok of the charge detector 43 becomes logical "0" level. The count "8" in the shift counter indicates that proper charging has not been set up in any one of one cycle of ink separation phase shifts. Then, the microcomputer 45 increments a frequency counter (program counter) to perform the next cycle of phase search. If the second cycle has failed to properly charge ink drops, the microcomputer 45 farther increments the frequency counter to perform the next cycle of phase search. Therefore, the count in the frequency counter represents an instantaneous number of executed cycles each consisting of eight times of ink separation phase shifts.

In this particular example, when the logical level of the detector output Pok does not become "0" (proper charge) even after ten cycles of phase search, the microcomputer 45 determines the ejection unusual so that it sets an ejection failure flag to clear the frequency counter, and triggers a 60-sec timer to enter into the ejection stop procedure in the main flow (FIG. 15). In the ejection stop procedure, the microcomputer 45 deacrivates the pumps 26 and 27, deenergizes the valve 8 (communicating the accumulator 4 to the reservoir 28), deenergizes the heater driver 38, and disenables the AND gate 462. That is, the microcomputer 45 interrupts ink ejection and cuts off the supply of charge voltage and drive voltage. Thereafter, the microcomputer awaits the lapse of sixty seconds. On the lapse of sixty seconds, the microcomputer 45 advances to a step next to the initialization of the main flow and, then, resumes the phase search (FIG. 16).

Again, if the detector output Pok does not turn to logical "0" even after ten cycles of phase search, the microcomputer 45 sets a failure display due to the presence of the ejection failure flag, resets the ejection flag, clears the frequency counter, and advances to the ejection stop procedure. In this ejection stop procedure, due to the absence of the ejection failure flag, the microcomputer 45 stops ejection while holding the failure display, until an ejection command is delivered thereto. In this situation, in response to an ejection command entered by an operator, the microcomputer 45 resets the failure display and advances to a step next to the initialization of the main flow. When the detector output Pok has become logical "0" during the second ink ejection and phase search, the microcomputer 45 determines that the ink ejection is properly conditioned to establish adequate charging and, therefore, it clears the shift counter, frequency counter and ejection failure flag to start on a deflection setting operation.

Figure 17A:
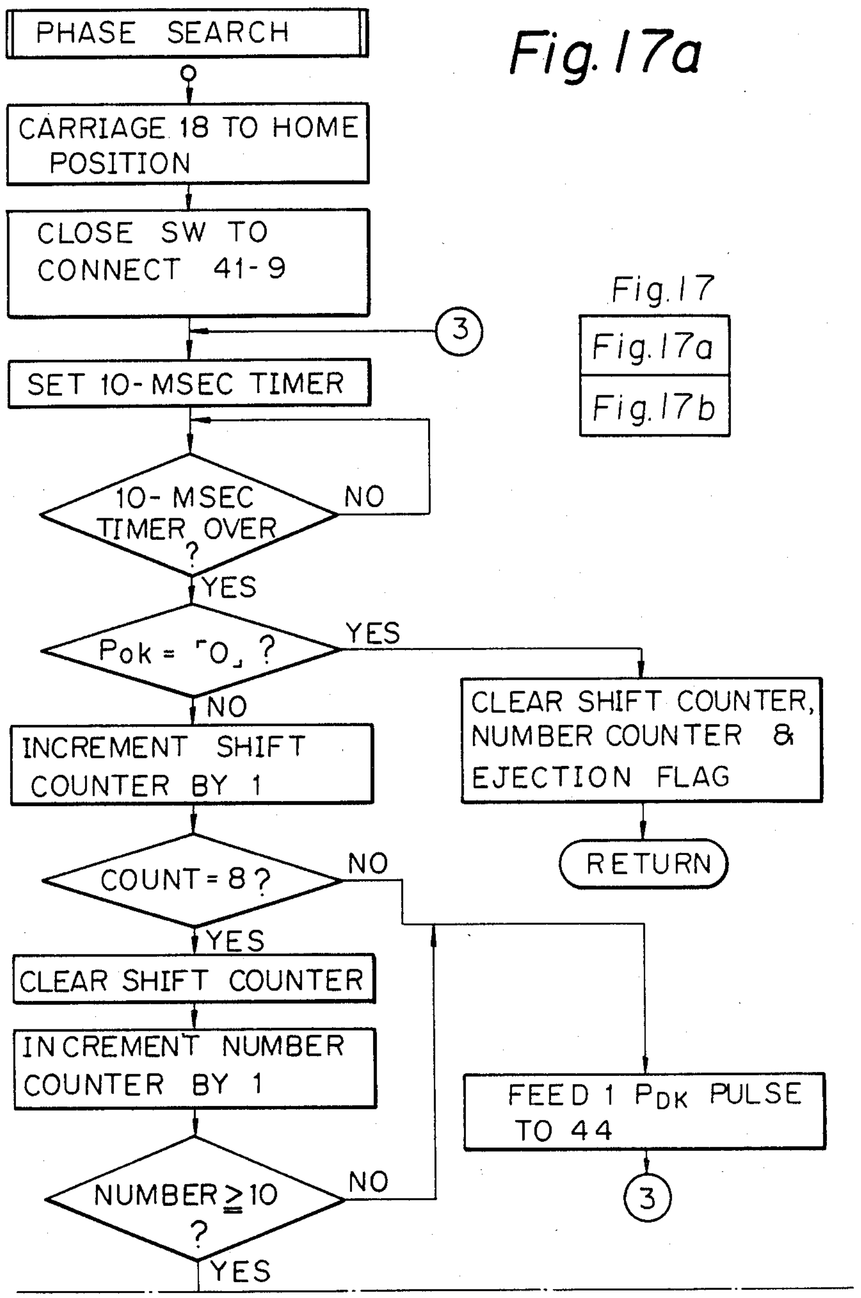
Figure 17B:
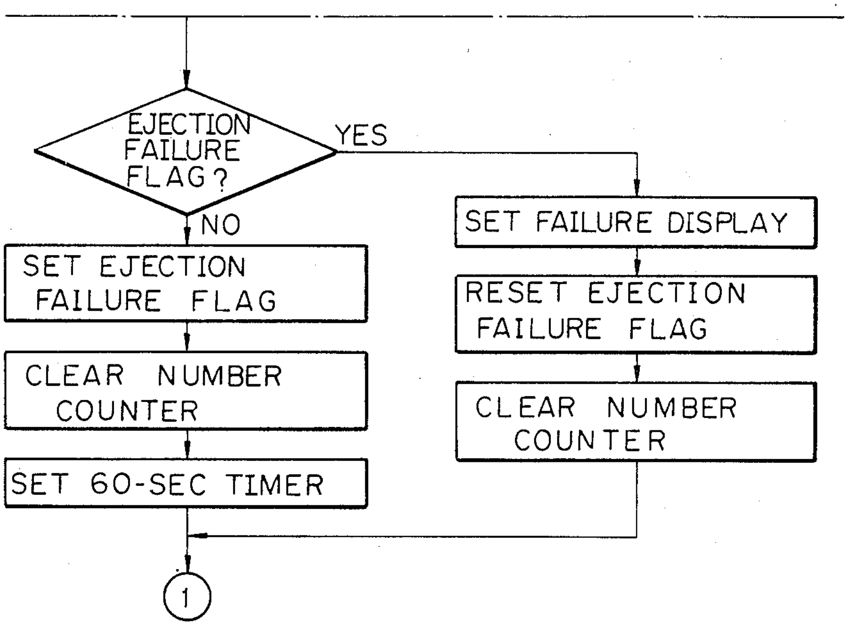

A phase search control applicable to the circuitry of FIG. 6 will be described with reference to FIG. 17.

In the phase search, the microcomputer 45 sets the carriage 18 at the home position, and closes the switch SW to connect the charge electrode to a search charge voltage generator 41. The deflection voltage source is not turned on. In this condition, the microcomputer 45 awaits the lapse of 10 msec. The connection of the switch SW to the search charge voltage generator 41 causes search charge pulses given by amplifying the search charge pulses Pp (see FIG. 9) to be fed to the electrode 9. That is, phase search charge pulses intermittently appearing at the period of 320 microseconds and having a period of 10 microseconds are fed from the search charge voltage generator 41 to the charge electrode 9 via the switch SW.

Assuming that the count code output from the counter CO2 is "000", the pulses appearing at the output terminal 0 of the shift register SR are applied to the drive voltage generator 39 as the drive pulse Vp and, therefore, the ink separates into drops in a phase corresponding to the period and phase of the drive pulses Vp (phase corresponding to the pulses Pp). If the separation of ink is timed to the pulse Pp, the resulting drop is negatively charged and, because the deflection voltage has been applied, it flies straight to impinge on the gutter 5. That is, the ink drops appearing at the period of the pulses Pp develop a charge pattern of a frequency of 320 microseconds in which sixteen successive drops are negatively charged and the next sixteen are uncharged, the charged drops impinging on the gutter 5. In this case, therefore, the potential at the gutter 5 varies in the same manner as the charge pattern.

However, due to the stray capacity of the shield wire 29 and the time constant of the resistor R, the base of the FET in the charge detector 43 develops a potential fluctuation in a sinusoidal wave or an envelope whose period is 320 microseconds. Such a sinusoidal voltage is inverted by the FET, amplified by the op amp OP1, and then applied to the high pass filter HPF at a positive level. The high pass filter HPF is adapted to cut off noise less than 320 microseconds in period. The integrator IGR smooths the sinusoidal wave of the 320-microsecond frequency to stabilize it at a d.c. constant level. This d.c. voltage is compared with a reference voltage by the comparator COM. If the d.c. voltage is higher than the reference voltage indicating that ink drops are charged, the output Pok of the comparator COM becomes logical "0". When ink drops are not charged or charged incompletely, the output Pokb of the comparator COM is logical "1". The output Pokb of the comparator COM is applied to the microcomputer 45 and to the AND gate AN1 of the phase setter 44.

To summarize the above operation, ink drops will be charaged if the separation phase of ink is coincident with the pulse Pp and not if not. The output Pokb of the charge detector 43*b* turns to the logical "0" level if the drops are charged, while remaining logical "1" level if not. Upon the lapse of 10 milliseconds, the microcomputer sees the detector output Pokb and, if it is logical "0", clears counters and flags to advance to a deflection setting step determining that the ink sepsration phase is properly related to the phase of the search charge voltage pulses. However, if the detector output Poks is logical "1" indicative of a deviation of the ink separation phase from the phase of the search charge voltage pulses, the microcomputer 45 increments a shift counter (program counter) by one to supply the phase setter 44 with a PDKL pulse.

In response to the Pdkl pulse, the phase setter 44 increments the counter CO2 by one so that the phase of the separation drive pulse Vp is delayed by one step. That is, as the counter CO2 is incremented, the output Vp of the data selector DS changes from a pulse appearing at an output terminal i of the shift register SR to a pulse appearing at an output terminal i+1. The counter CO2 is a cyclic counter. If the ink ejection is normal, ink droplets will be charged to make the output Pokb of the comparator COM logical "0" while pulses appearing at either one of the outputs 0–7 of the shift register SR are applied to the drive voltage generator 39. The microcomputer 45, after the supply of the Pdkl pulse to the phase setter 44, awaits the lapse of 10 milliseconds. As this period of time expires, the microcomputer 45 sees the detector output Pokb and, if it is logical "0", advances to a deflection setting step and, if it logical "1", increments the shift counter to supply a Pdk1 pulse to the phase setter 44 and sets the 10-msec timer.

In the manner described, the microcomputer 45 supplies countup pulses Pdk to the phase setter 44 until the output Pokb of the charge detector 43*b* becomes logical "0" level. The count "8" in the shift counter indicates that proper charging has not been set up in any one of one cycle of ink separation phase shifts. Then, the microcomputer 45 increments a frequency counter (program counter) to perform the next cycle of phase search. If the second cycle has failed to properly charge ink drops, the microcomputer 45 farther increments the frequency counter to perform the next cycle of phase search. Therefore, the count in the frequency counter represents an instantaneous number of executed cycles each consisting of eight times of ink separation phase shifts.

In this particular example, when the logical level of the detector output Pokb does not become "0" (proper charge) even after ten cycles of phase search, the microcomputer 45 determines the ejection unusual so that it sets an ejection failure flag to clear the frequency counter, and triggers a 60-sec timer to enter into the ejection stop procedure in the main flow (FIG. 15). In the ejection stop procedure, the microcomputer 45 deactivates the pumps 26 and 27, deenergizes the valve 8 (communicating the accumulator 4 to the reservoir 28), deenergizes the heater driver 38, and disenables the AND gate 462. That is, the microcomputer 45 interrupts ink ejection and cuts of the supply of charge voltage and drive voltage. Thereafter, the microcomputer awaits the lapse of sixty seconds. On the lapse of sixty seconds, the microcomputer 45 advances to a step next to the initialization of the main flow and, then resumes the phase search (FIG. 17).

Again, if the detector output Pokb does not turn to logical "0" even after ten cycles of phase search, the microcomputer 45 sets a failure display due to the presence of the ejection failure flag, resets the ejection flag, clears the frequency counter, and advances to the ejection stop procedure. In this ejection stop procedure, due to the absence of the ejection failure flag, the microcomputer 45 stops ejection while holding the failure display, until an ejection command is delivered thereto. In this situation, in response to an ejection command entered by an operator, the microcomputer 45 resets the failure display and advances to a step next to the initialization of the main flow. When the detector output Pokb has become logical "0" during the second ink ejection and phase search, the microcomputer 45 determines that the ink ejection is properly conditioned to establish adequate charging and, therefore, it clears the shift counter, frequency counter and ejection failure flag to start on a deflection setting operation.

Figure 18A:
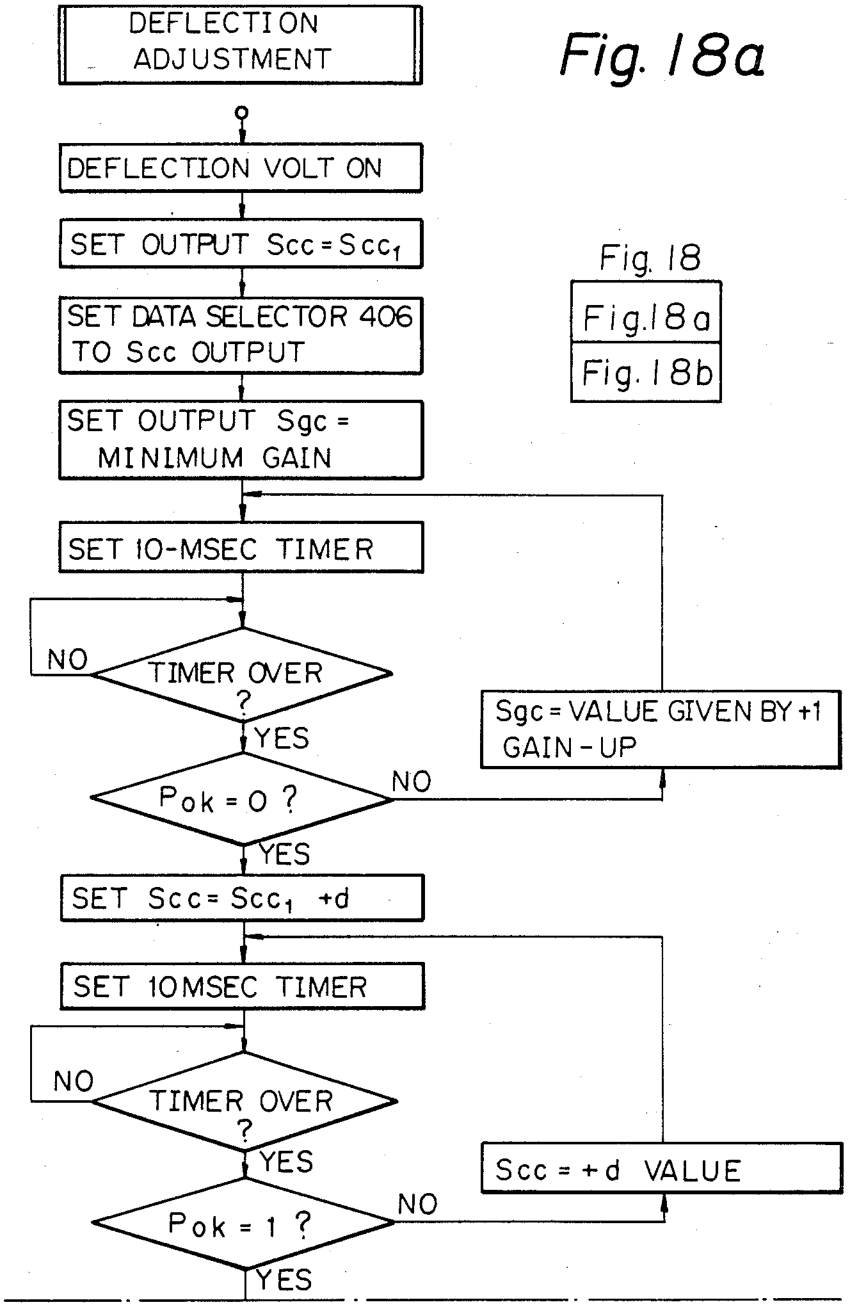
FIGS. 18–20 are flowcharts demonstrating a deflection setting control also performed by the microcomputer.
Figure 18B:
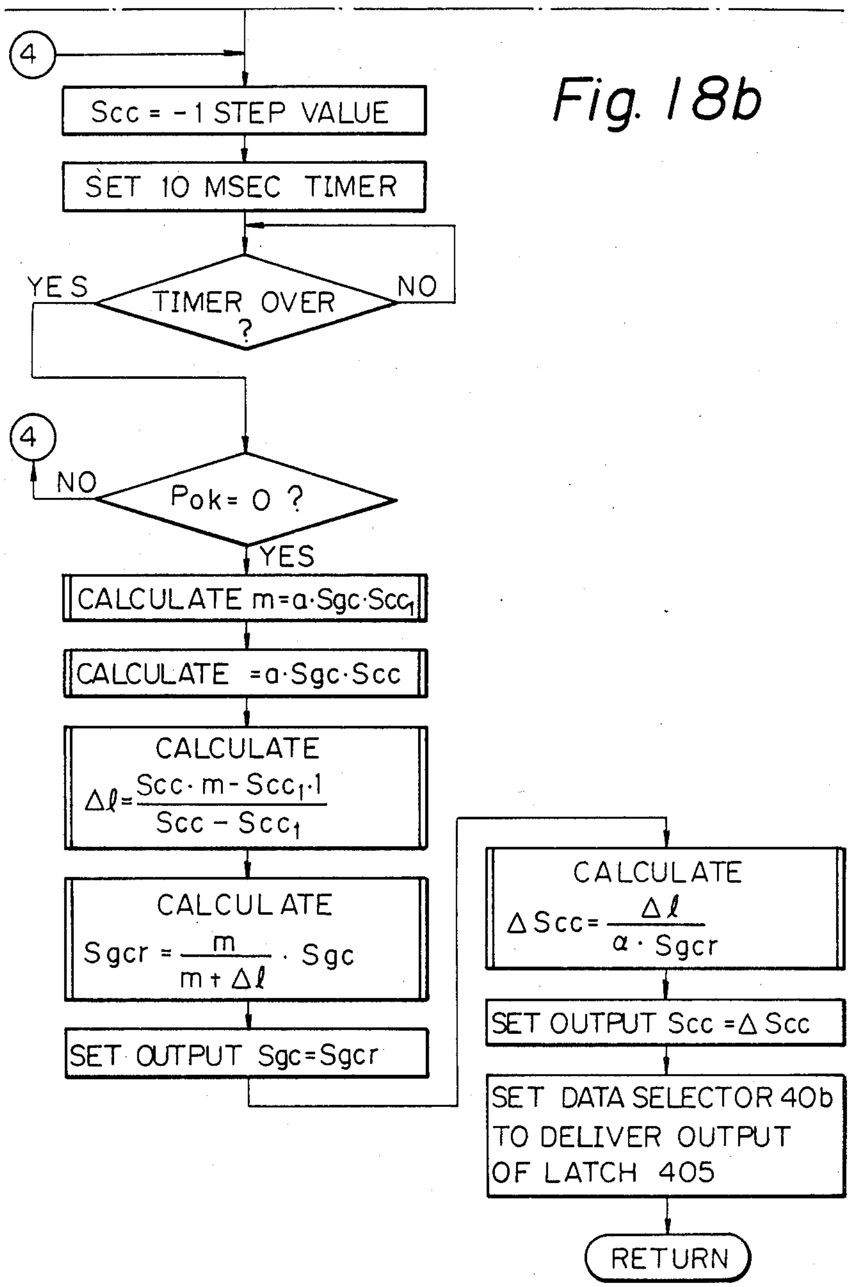

FIG. 18 shows a deflection setting procedure which the circuitry of FIG. 5 performs.

In the deflection setting procedure, the microcomputer 45 first instructs the deflection voltage source circuit 42 to supply a deflection voltage. The microcomputer 45 sets at its output port and supplies the data selector 406 with a charge code Scc which is a charge code Scc1 (C1) for causing charged drops to be caught by the gutter 5 even if deflected, at the lowermost gain. At the same time, the microcomputer 45 instructs the data selector 406 to deliver the code Scc. Next, the microcomputer 45 sends out the lowermost gain code to the fain adjuster 40*b* as a gain code Sgc, the gain code being latched by the latch LA2. The microcomputer 45 makes the gate signal DGc fed to the gain adjuster 40*b* logical "0" to disenable the AND gate AN2 and enable the AND gate AN4. Then, the microcomputer 45 supplies the shift register 408 with a logical print level (charge instruction level) "1" as a video signal, thereby setting up charge deflection. The microcomputer 45 activates a 10-msec timer (program timer) to await the lapse of ten milliseconds. As soon as the time is over, the microcomputer 45 checks the output Pok of the charge detector 43 and, if it is logical "1" indicative of impingement of ink drops on the gutter 5 (not on the electrode 13), changes the gain code Sgc to one which increases the gain by one step. Thereafter, the microcomputer 45 sets the 10-msec timer again, and sees the detector output Pok on the lapse of ten milliseconds. This is repeated until the detector output becomes logical "0".

When the detector output Pok has turned to logical "0", the Sgc code (g) of that instant is memorized. The microcomputer 45 increases the charge code Scc by d this time (d being an integer larger than 1), and then triggers the 10-msec timer to perform another drop charging operation, while awaiting the lapse of the time. As the time is over, the microcomputer 45 again sees the output Pok of the charge detector 43 and, if it is logical "0" indicative of impingement of ink drops on the electrode 13, farther increases the charge code by d and activates the 10-msec timer. On the expiration of ten milliseconds, the microcomputer 45 checks the detector output Pok again. Such a procedure is repeated thereafter. When the detector output Pok has turned to logical "1" (indicating that ink drops have missed the upper edge of the electrode 13), the microcomputer 45 changes the charge code Scc to one which is smaller than the preceding one by the minimum unit, 1. The microcomputer 45 triggers the 10-msec timer and awaits the lapse of the time. Then, the microcomputer 45 checks the detector output Pok again, farther decreases the charge code Scc by the minimum unit, 1, and then waits until ten milliseconds expires. This is followed by the same procedure as already described. As soon as the detector output Pok becomes logical "0" (indicative of impingement of ink drops on the upper edge of the electrode 13), the microcomputer 45 stores the charge code Scc (C2) of that instant.

Figure 19A:
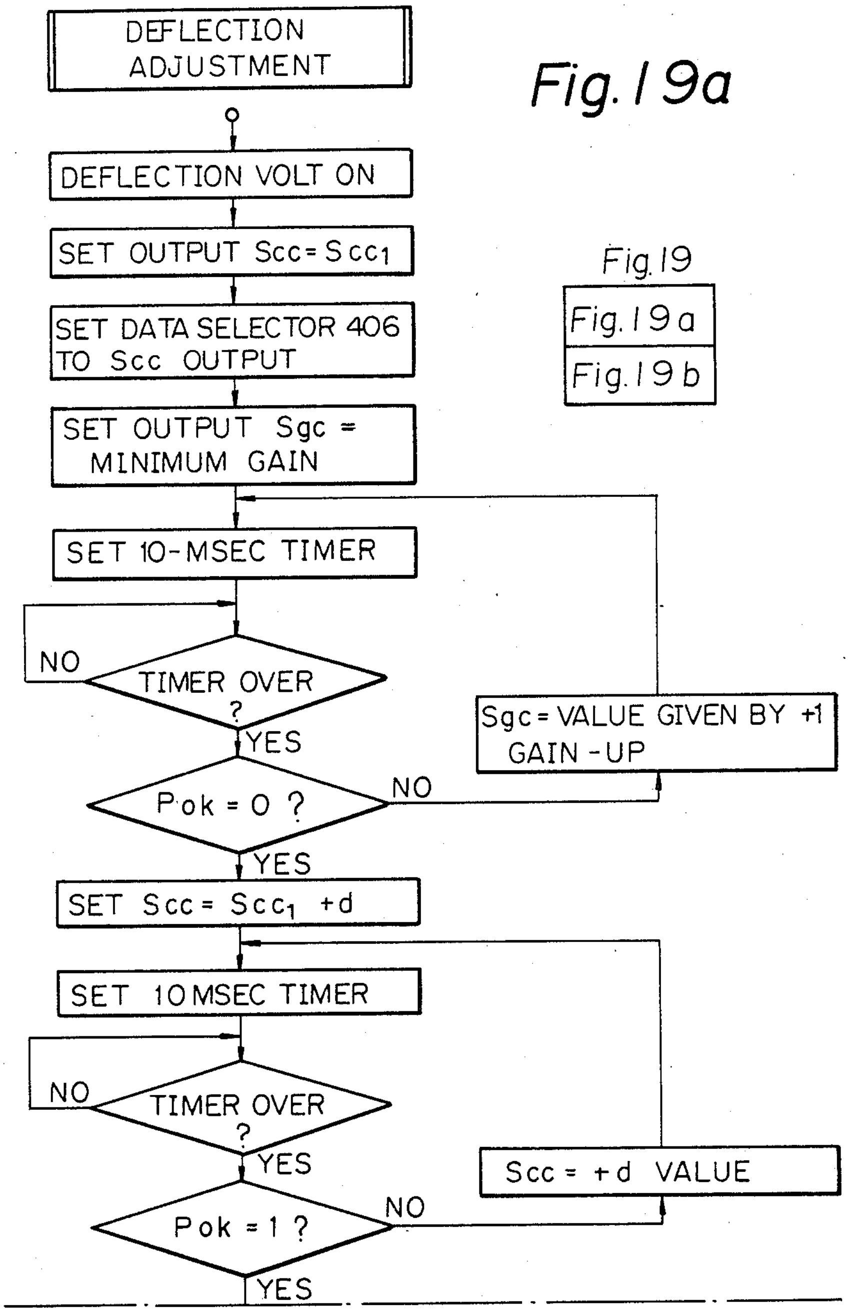
Figure 19B:
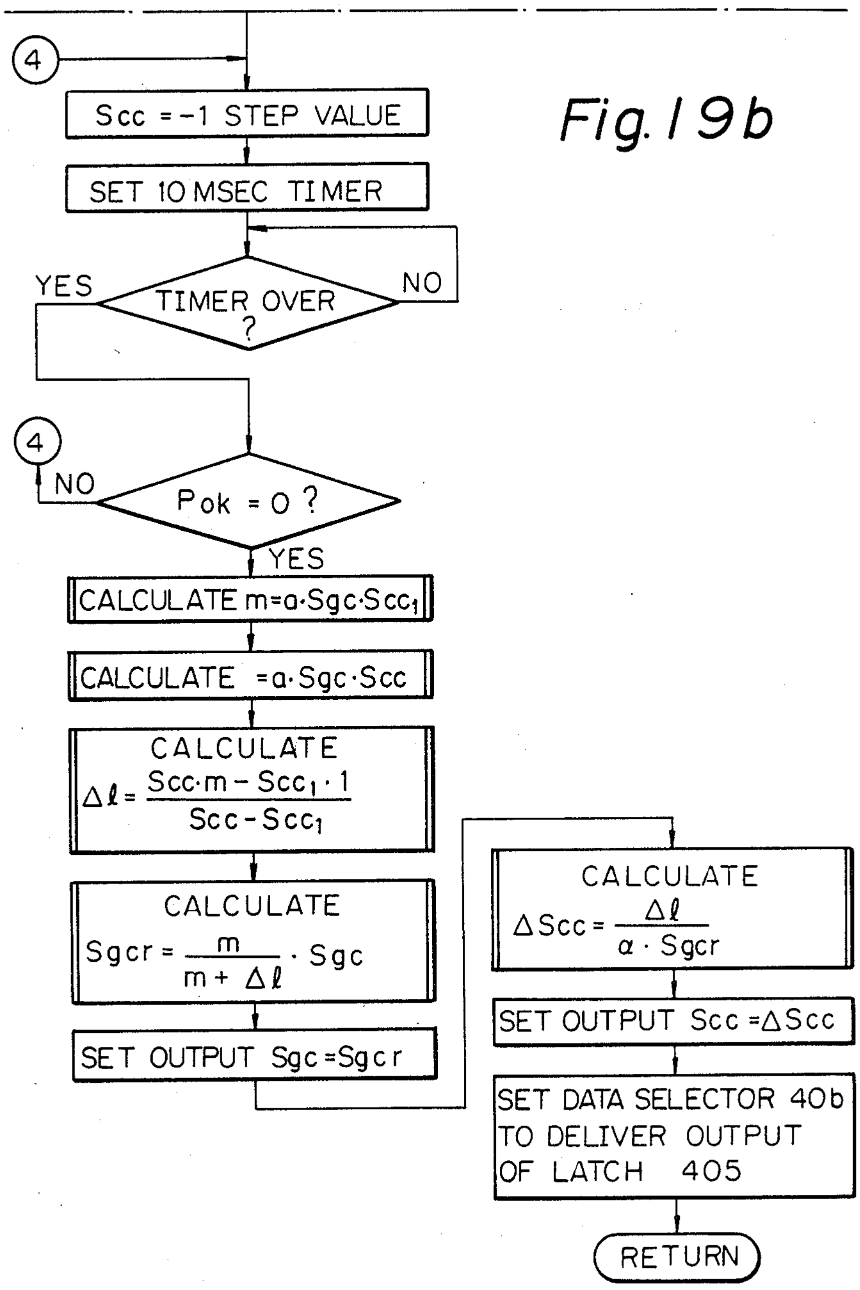

FIG. 19 shows a deflection setting procedure which the circuitry of FIG. 6 performs.

In the deflection setting procedure, the microcomputer 45 first instructs the deflection voltage source circuit 42 to supply a deflection voltage. The microcomputer 45 sets at its output port and supplies the data selector 406 with a charge code Scc which is a charge code Scc1 (C1) for causing charged drops to be caught by the gutter 5 even if deflected, at the lowermost gain. At the same time, the microcomputer 45 instructs the data selector 406 to deliver the code Scc. Next, the microcomputer 45 sends out the lowermost gain code to the gain adjuster section **40*b* as a gain code Sgc, the gain code being latched by the latch LA2. The microcomputer 45 makes the gate signal DGc fed to the gain adjuster 40*b* logical "0" to disenable the AND gate AN2 and enable the AND gate AN4. Then, the microcomputer 45 supplies the shift register 408 with a logical print level (charge instruction level) "1" as a video signal, thereby setting up charge deflection. The microcomputer 45 activates a 10-msec timer (program timer) to await the lapse of ten milliseconds. As soon as the timer is over, the microcomputer 45 checks the output Pokb of the charge detector 43*b* and, if it is logical "0" indicative of impingement of ink drops on the gutter 5, changes the gain code Sgc to one which increases the gain by one step. Thereafter, the microcomputer 45** sets the 10-msec again, and sees the detector output Pokb on the lapse of ten milliseconds. This is repeated until the detector output becomes logical "1".

When the detector output Pokb has turned to logical "1", the Sgc code (g) of that instant is memorized. The microcomputer 45 increases the charge code Scc by d this time (d being an integer larger than 1), and then triggers the 10-msec timer to perform another drop charging operation, while awaiting the lapse of the time. As the time is over, the microcomputer 45 again sees the output Pokb of the charge detector **43*b* and, if it is logical "0" indicative of impingement of ink drops on the electrode 13, farther increases the charge code by d and activates the 10-msec timer. On the expiration of ten milliseconds, the microcomputer 45 checks the detector output Pokb again. Such a procedure is repeated thereafter. Then the detector output Pokb has turned to logical "1", (indicating that ink drops have missed the upper edge of the electrode 13), the microcomputer 45 changes the charge code Scc to one which is smaller than the preceding one by the minimum unit, 1. The microcomputer 45 triggers the 10-msec timer and awaits the lapse of the time. Then, the microcomputer 45 checks the detector output Pokb again, farther decreases the charge code Scc by the minimum unit, 1, and then waits until ten milliseconds expires. This is followed by the same procedure as already described. As soon as the detector output Pokb becomes logical "0" (indicative of impingement of ink drops on the upper edge of the electrode 13), the microcomputer 45 stores the charge code Scc (C2**) of that instant.

Necessary data have been detected by the operation described above. Now, the microcomputer 45 calculates m using Eq. (4), l using Eq. (3), and then Δl using Eq. (5). The resulting gain Sgcr for printout is latched in the latch LA2 of the gain adjuster section **40*b*. Thereafter, the microcomputer 45 calculates the charge voltage compensation amount $\Delta Scc = (\Delta l)/(a \cdot Sgcr)$, where $Sgcr = (m/(m+\Delta l)) \cdot Sgc$, and latches it in the latch 411 of the charge code generator section. Then, the microcomputer 45 actuates the data selector 406 into a mode for delivering an output of the latch 405, and returns to the main routine shown in FIG. 10** to perform a print control.

As a result, the charge amplification gain is maintaimed at Sgcr, and the deflection compensation amount at ΔScc, which is added to all the standard charge codes Vcs (Cpi, i=1 to 32) read out for the respective deflection steps.

Figures 20, 20A, 20B:
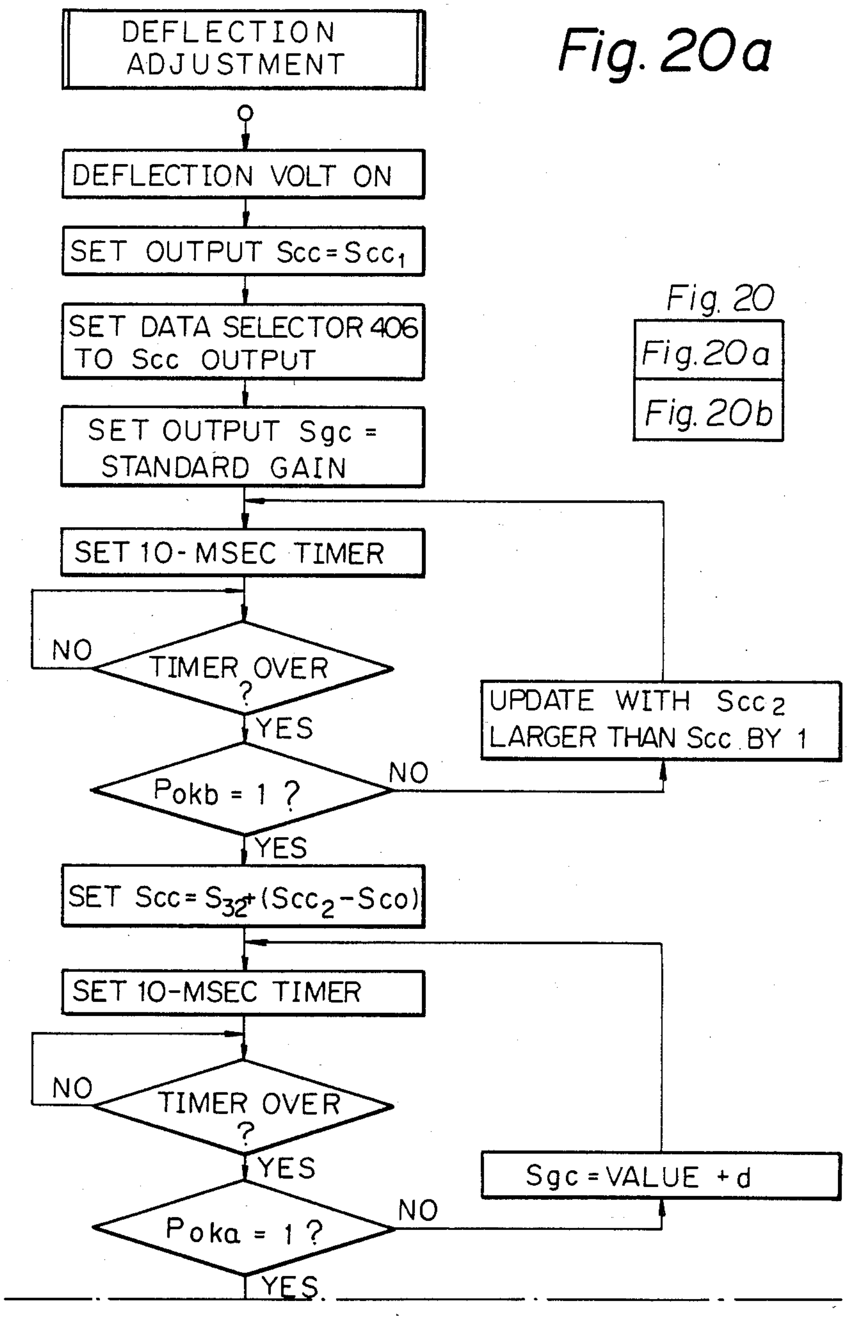
Figure 20B:
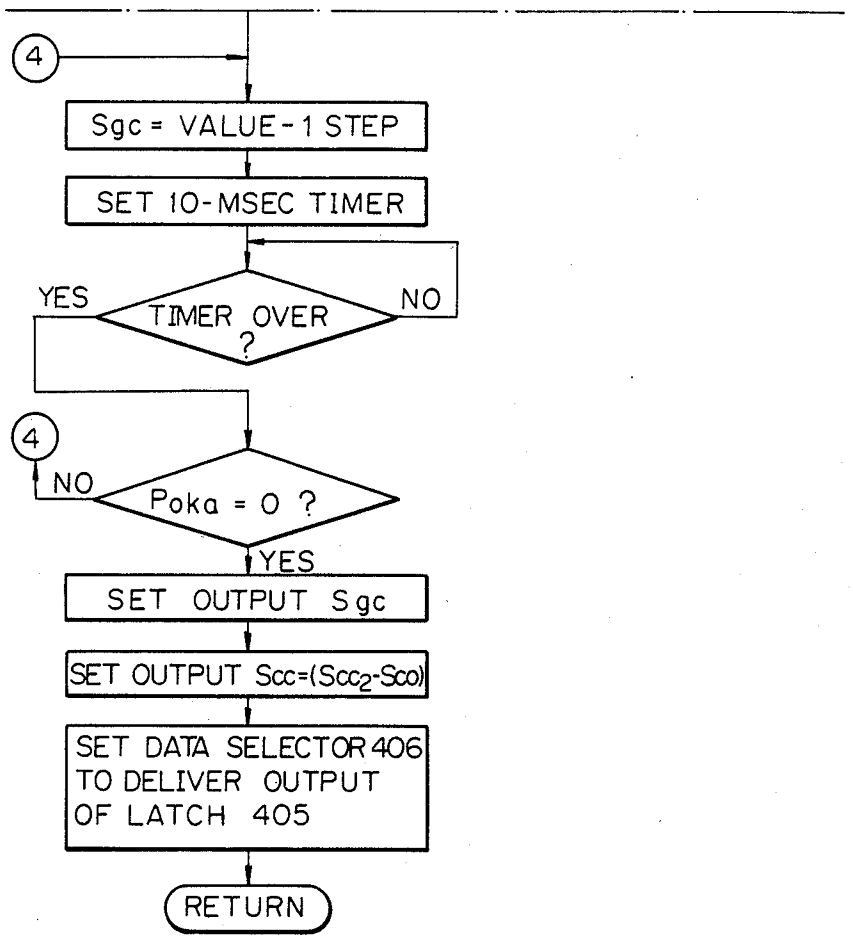

FIG. 20 shows a deflection setting procedure in accordance with still another example.

In the deflection setting procedure, the microcomputer 45 first instructs the deflection voltage source circuit 42 to supply a deflection voltage. The microcomputer 45 sets at its output port and supplies the data selector 406 with a charge code Scc which is a charge code Scc1 for causing charged drops to be caught by the gutter 5 even if deflected, at the lowermost gain. At the same time, the microcomputer 45 instructs the data selector 406 to deliver the code Scc. Next, the microcomputer 45 sends out a standard gain code to the gain adjuster section **40*b* as a gain code Sgc, the gain code being latched by the latch LA2. The microcomputer 45 makes the gate signal DGc fed to the gain adjuster 40*b* logical "0" to enable the AND gate AN2 and disenable the AND gate AN4. Then, the microcomputer 45 supplies the shift register 408 which a print level (charge instruction level) "1" as a video signal, thereby setting up charge deflection. The microcomputer 45 activates a 10-msec timer (program timer) to await the lapse of ten milliseconds. As soon as the timer is over, the microcomputer 45 checks the output Pokb of the charge detector 43***b* and, if it is logical "0" indicative of impingement of ink drops on the gutter 5 (not on the electrode 13), changes the gain code Sgc to one larger by the minimum unit, 1, than preceding one. Thereafter, the microcomputer 45 sets the 10-msec timer again, and sees the detector output Pokb on the lapse of ten milliseconds. This is repeated until the detector output Pokb becomes logical "1".

When the detector output Pokb has become logical "1", the charge code Scc2 of that instant is stored. The microcomputer 45 subtracts from the charge code Scc2 a charge code Sc0 which causes ink drops to miss the upper edge of the gutter 5 when the ink ejection is proper, the difference representing a compensation amount $\Delta S=(Scc2-Sc0)$ for the flight path against deviation of the ejection axis. The microcomputer 45 stores the compensation amount ΔS, delivers to the data selector 406 a charge code which is the sum of the compensation amount ΔS and a standard charge code S32 (Cp32) for the 32nd step, triggers the 10-msec timer, and then awaits the lapse of the time. As ten milliseconds expires, the microcomputer sees the output Poka of the charge detector 43*a* and, if it is logical "0" indicative of impingement of ink drops of the electrode 13, increases the gain by d, activates the 10-msec timer, and again checks the detector output Poka as soon as the time is over. This is repeated thereafter. When the detector output Pok has turned to logical "1" (ink drops have missed the upper edge of the electrode 13), the microcomputer 45 changes the gain code to one which is smaller than the preceding one by the minimum unit, 1, triggers the 10-msec timer again, and awaits the lapse of the time. As the time is over, the microcomputer 45 checks the detector output Poka and, if it is logical "1", farther reduces the gain code Sgc by the minimum unit, 1, and then awaits the expiration of ten milliseconds. This is followed by the previously described procedure. As soon as the detector output Poka has become logical "0" (indicative of impingement of ink drops on the upper edge on the upper edge of the electrode 13), the microcomputer 45 latches the gain code Sgc of that instant directly in the latch LA2 of the gain adjuster.

The microcomputer 45 delivers $Scc=S=(Scc2-Sc0)$ to the data selector 411. Then, the microcomputer 411 actuates the data selector 406 into a mode for delivering an output of the latch 405, and then returns to the main routine shown in FIG. 15 to enter into the print control. Therefore, during the print control, the deflection compensation amount is made ΔS which is added to reference charge codes Vcs (Cpi, i=1 to 32) read out at the respective deflection steps.

The procedure described above has set up a charge code compensation amount for making up for a dislocation of the ejection axis, and a charge gain for directing the 32nd step charged drop to a predetermined position on the paper. Due to the compensation for the dislocation of the ejection shaft, the gain adjuster for the above-described one point (32nd step) is equivalent in effect to the adjustment of all the deflection steps. Eventually, the printing position is prevented from being dislocated throughout the deflection steps.

The charge pattern on ink drops is such that a string of sixteen drops (160 microseconds) are alternately charged and the next string of sixteen drops (160 microseconds) are uncharged, one period being 320 microseconds as a whole. It is noteworthy that while in the phase search the charge voltage (corresponding to Pp) is applied such that a string of successive drops are charged, in the deflection adjustment there is applied a charge voltage synchronous with the pulse signal Cp which is one half the Pp in frequency, and ink drops appear in one-to-one correspondence with the pulse Pp. Thus, one period of the charge pattern is 320 microseconds in the deflection control as well.

After completing the ink ejection setting control, phase search control, and deflection setting control the microcomputer 45 advances to the print control. In the print control, because Dg0="1" has been set, the AND gate AN4 in the print charge voltage generator 40 is enabled and the AND gate AN2, disenabled. Therefore, while the video signal is logical "1" instructing a printing operation, the print charge signal Cp appears at an output terminal of an OR gate OR1 as it is. If the video signal is logical "0" instructing nonprinting, the AND gate AN4 intercepts the pulses Cp so that the logical "0" output of the OR gate OR1 disenables the AND gate group ANG. As previously mentioned, the microcomputer 45 in the print charge control triggers the 80-sec timer, interrups the print charge control after the time is over and at a predeteremined point of recording operation, advances to a step next to the initialization of the main flow shown in FIG. 10, checks the conditions of various sections and performs a phase search control and a deflection setting control, triggers the 80-sec timer again when completed them and returns to the print control, executes the previously discussed processings after eighty seconds, and repeats this operation thereafter.

In the embodiment shown and described, the phase of charge voltage pulses is fixed, and that of ink separation is shifted for phase search, in order to properly charge ink drops. Alternatively, the phase of charge voltage pulses may be shifted with the ink sep separation phase locked.

Conductive gutter may comprise an ordinary gutter in order to omit the charge detector 43*b*. In such a case, flight of low deflection ink drops missing the gutter 5 may be represented by a change of the output Poka of the charge detector 43*a* from logical "1" to logical "0" which will occur on the impingement of the ink drops on the charge detector electrode.

If desired, only the compensation for a dislocation of the ink ejection axis may be attempted by omitting the electrode 13 and charge detector 43*a*. This will simplify the overall construction and arrangement.

Various modifications will become possible for those skilled in the art after receiving the teachings of the present disclosure without departing from the scope thereof.

What is claimed is:

1. A deflection control ink jet recording apparatus comprising:

an ink ejection head having an ink ejection nozzle and a vibrator for applying pressure vibration of a predetermined period to ink which is communicated to said nozzle;

a pump for supplying ink under pressure to said ink ejection head;

a charging electrode for applying a charging electric field to ink ejected from the nozzle;

a deflection electrode for applying a deflecting electric field to charged ink drops;

a gutter for capturing uncharged nonprinting ink drops;

charge detecting electrode means for detecting low deflection ink drops which miss an upper edge of said gutter and ink drops higher in deflection than said drops;

a charge detector circuit connected to said charge detecting electrode means for generating an output signal which indicates detection/nondetection of charged ink drops; and an electronic control unit for reading the detection/-nondetection of charged ink drops indicated by the charge detecting electrode means and the charge detector circuit, adjusting a charge voltage amplification gain to detect a charge voltage amplification gain in the event of a change of the detection and the nondetection of ink drops from one to the other, adjusting a charge voltage code to detect a charge voltage code in the event of a change of the detection and the nondetection of ink drops from one to the other, and computing in accordance with a predetermined function a charge voltage amplification gain and a charge voltage code for a printout operation based on the detected gain and the detected charge voltage code.

2. An apparatus as claimed in claim 1, in which the electronic control unit is constructed to obtain a charge voltage amplification gain and a charge voltage code compensation amount for a print charge operation based on the detected gain and the detected charge voltage code, and add the compensation amount to or subtract the compensation amount from a predetermined charge voltage code assigned to each deflection step in accordance with a relation therebetween, thereby setting a charge voltage code for each deflection step.

3. An apparatus as claimed in claim 1, in which the electronic control unit is constructed to read detection/nondetection of charged ink drops indicated by the charge detecting electrode means and the charge detector circuit, increase the charge voltage amplification gain to detect a charge voltage amplification gain in the event of impingement of charged ink drops on the upper edge of the gutter, and increase the charge voltage code to detect a charge voltage code in the event of impingement of charge ink drops on the upper edge of the gutter.

4. A deflection control ink jet recording apparatus comprising:

an ink ejection head having an ink ejection nozzle and a vibrator for applying pressure vibration of a predetermined period to ink which is communicated to said nozzle;

a pump for supplying ink under pressure to said ink ejection head;

a charging electrode for applying a charging electric field to ink ejected from the nozzle;

a deflection electrode for applying a deflecting electric field to charged ink drops;

first electrode means for detecting charged ink drops;

a charge detector circuit connected to said first electrode means for generating an output signal which indicates detection/nondetection of charged ink drops;

second electrode means for detecting charged ink drops which is deviated from said first electrode means in a direction in which an amount of deflection increases;

a charge detector circuit connected to said second electrode means for generating an output signal which indicates detection/nondetection of charged ink drops; and an electronic control unit for reading the detection/-nondetection of charged ink drops indicated by the second electrode means and the charge detector circuit and adjusting a charge voltage code to detect a charge voltage code in the event of a change of the detection and the nondetection from one to the other, and setting a charge voltage amplification gain and a charge voltage code for a printout operation based on the detected gain and the detected charge voltage code.

5. An apparatus as claimed in claim 4, in which the electronic control unit is constructed to obtain a charge voltage amplification charge voltage code compensation amount for a print charge operation based on the detected gain and the detected charge voltage code, and add the compensation amount to or subtract the compensation amount from a predetermined charge voltage code for each deflection step in accordance with a relation therebetween, thereby setting a charge voltage code for each deflection step.

6. An apparatus as claimed in claim 4, in which the first electrode means comprises a conductive gutter for capturing nonprinting ink drops, the second electrode means comprising a flat charge detecting electrode having an edge thereof positioned at the maximum deflection print level.

7. A deflection control ink jet recording apparatus comprising:

an ink ejection head having an ink ejection nozzle and a vibrator for applying pressure vibration of a predetermined period to ink which is communicated to said nozzle;

a pump for supplying ink under pressure to said ink ejection head;

a charging electrode for applying a charging electric field to ink ejected from the nozzle;

a deflection electrode for applying a deflecting electric field to charged ink drops;

charge detecting electrode means for detecting charged ink drops;

a charge detector circuit connected to said charge detecting electrode means for generating an output signal which indicates detection/nondetection of charged ink drops; and an electronic control unit for reading detection/-nondetection of charged ink drops indicated by the charge detecting electrode means and the charge detector circuit, increasing a charge code to detect a charge code in the event of impingement of charged ink drops on an upper edge of a gutter and, thereby, obtain a charge code compensation value, and setting charge codes to be assigned to respective deflection steps on the basis of the compensation value.

8. An apparatus as claimed in claim 7, in which the electronic control unit is constructed to set charge voltage codes for the respective deflection steps by adding the compensation amount to or subtracting the compensation amount from predetermined charge voltage codes assigned to the respective deflection steps in accordance with a relation therebetween.

9. An apparatus as claimed in claim 7, in which the charge detecting electrode means comprises a conductive gutter for catching nonprinting ink drops.

10. An apparatus as claimed in claim 7, in which the charge detecting electrode means comprises an electrode independent of a gutter which captures nonprinting ink drops, said electrode being disposed in a position for detecting ink drops which miss an end of the gutter.

11. An apparatus as claimed in claim 7, in which the charge detecting electrode means comprises a conductive gutter for capturing nonprinting ink drops, and an electrode independent of said conductive gutter and disposed in a position for detecting ink drops which miss an end of the gutter.

* * * * *